US009276958B2

(12) United States Patent
Hagiwara et al.

(10) Patent No.: US 9,276,958 B2
(45) Date of Patent: Mar. 1, 2016

(54) CUSTOMIZING SECURITY ROLE IN DEVICE MANAGEMENT SYSTEM, APPARATUS AND METHOD

(71) Applicants: Kenji Hagiwara, Edgewater, NJ (US); Jim Vopni, Kitchener, CA (US); Shun Tanaka, West New York, NJ (US)

(72) Inventors: Kenji Hagiwara, Edgewater, NJ (US); Jim Vopni, Kitchener, CA (US); Shun Tanaka, West New York, NJ (US)

(73) Assignee: RICOH COMPANY, LTD., Tokyo (JP)

( * ) Notice: Subject to any disclaimer, the term of this patent is extended or adjusted under 35 U.S.C. 154(b) by 91 days.

(21) Appl. No.: 13/758,089

(22) Filed: Feb. 4, 2013

(65) Prior Publication Data

US 2014/0223512 A1 Aug. 7, 2014

(51) Int. Cl.
H04L 29/06 (2006.01)
(52) U.S. Cl.
CPC .............. H04L 63/20 (2013.01); H04L 63/083 (2013.01); H04L 63/10 (2013.01); H04L 63/1433 (2013.01)
(58) Field of Classification Search
CPC ..... G06F 21/552; H04L 63/1433; H04L 9/32; H04L 63/10; H04L 63/20; H04L 63/083; H04L 41/06
USPC ....................................... 726/4, 5, 6
See application file for complete search history.

(56) References Cited

U.S. PATENT DOCUMENTS

| | | | |
|---|---|---|---|
| 8,352,477 B2 | 1/2013 | Uchida et al. | |
| 2002/0145750 A1* | 10/2002 | Honda et al. | 358/1.15 |
| 2002/0169975 A1* | 11/2002 | Good | 713/200 |
| 2003/0018910 A1* | 1/2003 | Wert et al. | 713/200 |
| 2009/0064303 A1* | 3/2009 | Dickinson et al. | 726/10 |
| 2009/0183238 A1* | 7/2009 | Rasmusson et al. | 726/4 |
| 2009/0183244 A1* | 7/2009 | Saraf et al. | 726/6 |
| 2009/0319527 A1* | 12/2009 | King et al. | 707/9 |
| 2010/0011438 A1* | 1/2010 | Bartley et al. | 726/17 |
| 2010/0036676 A1* | 2/2010 | Safdi et al. | 705/2 |
| 2010/0049573 A1* | 2/2010 | Kantorova et al. | 705/9 |
| 2010/0125855 A1* | 5/2010 | Ferwerda et al. | 719/317 |
| 2010/0131772 A1* | 5/2010 | Atashband et al. | 713/189 |
| 2011/0119742 A1* | 5/2011 | Maguire | 726/5 |
| 2011/0173270 A1 | 7/2011 | Uchida et al. | |
| 2011/0225493 A1 | 9/2011 | Uchida et al. | |
| 2011/0225501 A1 | 9/2011 | Uchida et al. | |
| 2011/0225504 A1 | 9/2011 | Uchida et al. | |
| 2011/0225627 A1 | 9/2011 | Uchida et al. | |
| 2012/0140255 A1 | 6/2012 | Tanaka | |
| 2012/0191806 A1 | 7/2012 | Tanaka | |
| 2012/0218570 A1 | 8/2012 | Tanaka et al. | |
| 2012/0218578 A1 | 8/2012 | Tanaka | |
| 2012/0221901 A1 | 8/2012 | Tanaka | |
| 2012/0221954 A1 | 8/2012 | Tanaka | |
| 2012/0233667 A1* | 9/2012 | Amirov et al. | 726/4 |

(Continued)

OTHER PUBLICATIONS

U.S. Appl. No. 12/685,508, Yuki Uchida, Shun Tanaka, Conferencing Apparatus and Method.

(Continued)

*Primary Examiner* — Chau Le
*Assistant Examiner* — Don Zhao
(74) *Attorney, Agent, or Firm* — Cooper & Dunham LLP

(57) ABSTRACT

Systems, apparatuses and methods are provided for managing information technology devices in an information technology environment in which at least some of the devices are connected to a network, and access of each user in the information technology environment is customized in a convenient manner.

18 Claims, 31 Drawing Sheets

(56) References Cited

U.S. PATENT DOCUMENTS

2012/0265865 A1 10/2012 Tanaka et al.
2012/0266073 A1 10/2012 Tanaka et al.

OTHER PUBLICATIONS

U.S. Appl. No. 12/722,367, Yuki Uchida, Shun Tanaka, Kazuhiko Kato, Document Management Systems, Apparatuses and Methods Configured to Provide User Interface Customized for Specific User.
U.S. Appl. No. 12/722,370, Yuki Uchida, Shun Tanaka, Kazuhiko Kato, Document Management User Interface with User Customized Application Functionalities.
U.S. Appl. No. 12/722,374, Yuki Uchida, Shun Tanaka, Kazuhiko Kato, Access Limited Search Results.
U.S. Appl. No. 12/722,376, Yuki Uchida, Shun Tanaka, Kazuhiko Kato, User Specific Focus Parameters.
U.S. Appl. No. 12/722,381, Yuki Uchida, Shun Tanaka, Kazuhiko Kato, Document Management Systems, Apparatuses and Methods Configured to Provide Document Notification
U.S. Appl. No. 12/958,686, Shun Tanaka, Application Launcher Apparatus.
U.S. Appl. No. 13/014,384, Shun Tanaka, Accessing Functions of a Multifunction Device.
U.S. Appl. No. 13/036,455, Shun Tanaka, Controlling Alert Notification.
U.S. Appl. No. 13/036,558, Shun Tanaka, Error Report Management.
U.S. Appl. No. 13/036,644, Shun Tanaka, Display Filtering Device Management System.
U.S. Appl. No. 13/036,745, Shun Tanaka, Yuki Uchida, Converting Between Color and Monochrome.
U.S. Appl. No. 13/086,608, Shun Tanaka, Tom Haapanen, Jim Vopni, Device Management System.
U.S. Appl. No. 13/086,779, Shun Tanaka, Tom Haapanen, Jim Vopni, Device Management System Including Reporting Server.
U.S. Appl. No. 13/370,455, Shun Tanaka, Yuki Uchida, Relay Server Apparatus.
U.S. Appl. No. 13/370,481, Yuchi Uchida, Shun Tanaka, Application Supplying Apparatus and Relay Apparatus on Cloud.
U.S. Appl. No. 13/595,885, Yuchi Uchida, Shun Tanaka, Obtaining, Managing and Archiving Conference Data.
U.S. Appl. No. 13/685,849, Yuki Uchida, Shun Tanaka, Conference Data Management.
U.S. Appl. No. 13/758,082, Kenji Hagiwara, Tom Haapanen, Arturo Hung Tse, Device Management Apparatus, System and Method Including Remote Configuration of Device Preference Settings.
U.S. Appl. No. 13/758,097, Kenji Hagiwara, Jim Vopni, Shun Tanaka, System, Apparatus and Method for Managing Heterogeneous Group of Devices.
U.S. Appl. No. 13/758,103, Shun Tanaka, Jim Vopni, Management of Device Management Units.
U.S. Appl. No. 13/758,116, Greg Melendez, Tom Haapanen, Dynamic User Interface for Device Management System.
U.S. Appl. No. 13/758,110, Greg Anderson, Tom Haapanen, Kenji Hagiwara, Device Management System, Apparatus and Method Configured for Customizing a Power Filter.
U.S. Appl. No. 13/370,455, Shun Tanaka et al., Feb. 10, 2012.
U.S. Appl. No. 13/370,481, Yuki Uchida et al., Feb. 10, 2012.
U.S. Appl. No. 13/595,885, Yuki Uchida et al., Aug. 27, 2012.
U.S. Appl. No. 13/685,849, Yuki Uchida et al., Nov. 27, 2012.
U.S. Appl. No. 13/758,082, Kenji Hagiwara et al., filed Feb. 4, 2013.
U.S. Appl. No. 13/758,097, Kenji Hagiwara et al., filed Feb. 4, 2013.
U.S. Appl. No. 13/758,103, Shun Tanaka et al., filed Feb. 4, 2013.
U.S. Appl. No. 13/758,116, Greg Melendez et al., filed Feb. 4, 2013.
U.S. Appl. No. 13/758,110, Greg Anderson et al., filed Feb. 4, 2013.

* cited by examiner

DEVICE DATA

| Name | Manufacturer | IP address | Device Age | Status | Firmware Version | Department |
|---|---|---|---|---|---|---|
| MFP 301A | Company A | 172.16.121.255 | 2 years | Maximum storage capacity reached | 10.2.1 | IT |
| Printer 302A | Company B | 172.16.121.23 | 3 years | Ready | 2.009 | Accounting |
| Scanner 303A | Company A | 172.16.121.25 | 6 months | Sleep mode | 11.1.1 | Legal |

Fig. 5A

DEVICE SETTINGS INFORMATION

| Setting Name | Setting Type | Default Value | Options |
|---|---|---|---|
| Paper Size | Print | Letter | A4, Legal, Letter, Executive, A5, A6, B5, B6 |
| Duplex | Print | No | Yes, No |
| Pages Per Sheet | Print | 1 | 1, 2-in-1, 4-in-1, 9-in-1, 16-in-1, 25-in-1, 1 in 2x2 pages, 1 in 3x3 pages, 1 in 4x4 pages, 1 in 5x5 pages |
| Orientation | Print | Portrait | Portrait, Landscape |
| ... | ... | ... | ... |
| Time Zone | Date/Time | GMT – 05:00 | GMT, GMT + 01:00, GMT + 02:00 … GMT – 01:00 |

Fig. 5B

DEVICE CAPABILITIES INFORMATION

| Device Name | Setting Name |
|---|---|
| MFP 402A | copy, print, scan, fax, color printing, mobile printing, duplex printing, stapling, hole-punching, booklet finishing |
| Printer 403A | print, color printing, network printing, cloud printing |
| FAX 1209 | copy, print, fax |

Fig. 5C

| SYSTEM ACCESS ACTIVITIES INFORMATION | | | | |
|---|---|---|---|---|
| Date | User | Source IP Address | Action | Connection Type |
| 2013-1-2 00:24:49 | John_Doe | 24.8.12.71 | Login successful | HTTPS |
| 2013-1-2 00:26:12 | John_Doe | 24.8.12.71 | Launch device management application | HTTPS |
| 2013-1-2 00:28:02 | John_Doe | 24.8.12.71 | View device settings of MFP 402A | HTTPS |
| 2013-1-2 01:12:42 | John_Doe | 24.8.12.71 | Modify device settings of MFP 402A | HTTPS |
| 2013-1-2 02:00:17 | John_Doe | 24.8.12.71 | View device settings of Printer 403A | HTTPS |
| 2013-1-2 02:02:10 | John_Doe | 24.8.12.71 | Logout successful | HTTPS |

Fig. 5D

| SECURITY ROLE INFORMATION | |
|---|---|
| Role Name | Privileges |
| Full Admin | AddressBookRead, AuditRead, SysConfigRead, DeviceBasicRead, DeviceAdvancedRead, Public, SecurityRead, AddressBookWrite, AuditWrite, SysConfigWrite, DeviceBasicWrite, DeviceAdvancedWrite, SecurityWrite, LogDelete, ReportRead, ReportWrite, Customer Engineer |
| Device Basic Admin | AddressBookRead, SysConfigRead, DeviceBasicRead, DeviceAdvancedRead, Public, DeviceBasicWrite |
| Device Admin | AddressBookRead, SysConfigRead, DeviceBasicRead, DeviceAdvancedRead, Public, AddressBookWrite, DeviceBasicWrite, DeviceAdvancedWrite |
| Device Operator | AddressBookRead, SysConfigRead, DeviceBasicRead, DeviceAdvancedRead, Public |
| Address Book Admin | AddressBookRead, SysConfigRead, DeviceBasicRead, DeviceAdvancedRead, Public, AddressBookWrite |
| Security Admin | AuditRead, SysConfigRead, Public, SecurityRead, AuditWrite, SecurityWrite, LogDelete |
| User Admin | SysConfigRead, Public, SecurityRead, SecurityWrite |
| Reports Admin | Public, ReportRead, ReportWrite |
| Reports User | Public, ReportRead |
| Customer Engineer | Public, CustomerEngineer |

Fig. 5E

Logs – Device Management Tools (v1.0)

Logs

User Name: John_Doe

Date Range:

DM Unit:

View log

| Date | User | Source IP Address | Action | Connection Type |
|---|---|---|---|---|
| 2013-1-2 00:24:49 | John_Doe | 24.8.12.71 | Login successful | HTTPS |
| 2013-1-2 00:26:12 | John_Doe | 24.8.12.71 | Launch device management application | HTTPS |
| 2013-1-2 00:28:02 | John_Doe | 24.8.12.71 | View device settings of MFP 402A | HTTPS |
| 2013-1-2 01:12:42 | John_Doe | 24.8.12.71 | Modify device settings of MFP 402A | HTTPS |
| 2013-1-2 02:00:17 | John_Doe | 24.8.12.71 | View device settings of Printer 403A | HTTPS |
| 2013-1-2 02:02:10 | John_Doe | 24.8.12.71 | Logout successful | HTTPS |

Fig. 7B

Devices – Device Management Tools (v1.0) ☒

| Main Menu | Add | View/Configure Settings | View Device Capabilities | Uninstall | Help |

| DM Unit | Device Name | Address | Serial Number | MAC Address | Status |
|---|---|---|---|---|---|
| DM Unit 1 (DM 1210A) | | | | | |
| | Zebra XL P001 | 172.18.121.1 | Z000140192 | 00-4C-AE-F6-CA-A7 | On |
| | Zebra XP M2 | 172.18.121.2 | Z002002595 | 00-33-C6-C7-D3-A3 | On |
| | Zebra XP C1 | 172.18.121.3 | Z001924859 | 00-1F-08-CE-38-F8 | Off |
| | GoodScan M11 | 172.18.121.4 | 00029582 | 00-64-DD-15-22-B8 | Sleep |
| | HB12031 | 172.18.121.5 | 1000229586 | 00-19-21-7A-0F-0D | On |
| DM Unit 2 (DM 1213A) | | | | | |
| | Noxide 1 | 24.16.142.1 | 9772338035 | 00-DA-ED-62-2E-78 | Sleep |
| | Rhino X001 SP | 24.16.142.2 | 0124325331 | 00-91-FC-53-9F-BE | On |
| | Rhino X001 SP | 24.16.142.3 | 0120324647 | 00-84-B3-C4-24-36 | On |
| | Rhino X001 SP | 24.16.142.4 | 0127347369 | 00-E9-D4-AE-C1-8F | On |
| | Rhino X002 SP | 24.16.142.5 | 0127347369 | 00-89-53-6D-ED-93 | Off |
| | Rhino X002 SP | 24.16.142.6 | 0129984848 | 00-6D-07-1D-6C-C9 | Sleep |
| DM Unit 3 (DM 1215A) | | | | | |
| | Unicopy 1095S | 96.117.237.101 | 9526355 | 00-57-83-EC-2A-FD | Sleep |
| | Unicopy 1095X | 96.117.237.102 | 9526991 | 00-D9-7E-E7-95-05 | On |
| | Unicopy 1095X | 96.117.237.103 | 9526700 | 00-88-E7-D6-28-21 | Sleep |
| | Unicopy 1095X | 96.117.237.104 | 9526927 | 00-82-76-2E-90-64 | Off |
| | Unicopy 1095L | 96.117.237.105 | 9526284 | 00-CF-8A-EC-93-7D | On |

Fig. 7C

Security Roles – Device Management Tools (v1.0)

Logged in as: John Smith (admin)

Users

| ID | Name | Department |
|---|---|---|
| 1 | John Doe | IT |
| 2 | Peter Su | Accounting |
| 3 | Kate Roy | IT |
| 4 | Paul Kim | Legal |
| 5 | Ann Ford | Legal |

[New] [Edit] [Delete]

Assigned Security Role: Device Admin

[Create New] [Edit] [Delete]

Access Privilege Summary:

| AddressBookRead | ✓ | DeviceAdvancedRead | ✓ | AuditWrite | ✓ | SecurityWrite | |
|---|---|---|---|---|---|---|---|
| AuditRead | | Public | ✓ | SysConfigWrite | ✓ | TaskWrite | |
| SysConfigRead | ✓ | SecurityRead | | DeviceBasicWrite | ✓ | ReportRead | ✓ |
| DeviceBasicRead | ✓ | AddressBookWrite | ✓ | DeviceAdvancedWrite | ✓ | ReportWrite | ✓ |

[OK] [Cancel] [Help]

Security Roles – Device Management Tools (v1.0)

Logged in as: John Smith (admin)

Users

| ID | Name | Department |
|---|---|---|
| 1 | John Doe | IT |
| 2 | Peter Su | Accounting |
| 3 | Kate Roy | IT |
| 4 | Paul Kim | Legal |
| 5 | Ann Ford | Legal |

[ New ] [ Edit ] [ Delete ]

Assigned Security Role: Custom_1

- Full Admin
- Device Admin
- Device Operator
- Security Admin
- Reports Admin
- Custom_1

[ Create New ] [ Edit ] [ Delete ]

Access Privilege Summary:

| AddressBookRead | DeviceAdvancedRead | ✓ | AuditWrite | | SecurityWrite | |
|---|---|---|---|---|---|---|
| AuditRead | Public | | SysConfigWrite | ✓ | TaskWrite | |
| SysConfigRead | SecurityRead | | DeviceBasicWrite | | ReportRead | ✓ |
| DeviceBasicRead | AddressBookWrite | | DeviceAdvancedWrite | | ReportWrite | |

[ OK ] [ Cancel ] [ Help ]

Fig. 10

New Security Role – Device Management Tools (v1.0)

Role Name: Custom_2

Login Expiry Time: 10 minutes

Group: IT_USA

Users: John_Doe, Peter_Su, Kate_Roy    [Add]

View: Device Admin

| DM Unit Restriction | |
|---|---|
| Select All | DM Unit |
|  | CM (Global) |
| ✓ | DM (USA_NY) |
| ✓ | DM (USA_CA) |
|  | DM (Tokyo) |
|  | DM (Osaka) |
|  | DM (London) |

| AddressBookRead |  | DeviceAdvancedRead | ✓ | AuditWrite |  | SecurityWrite |  |
|---|---|---|---|---|---|---|---|
| AuditRead | ✓ | LogDelete |  | SysConfigWrite |  | TaskWrite | ✓ |
| SysConfigRead |  | SecurityRead |  | DeviceBasicWrite | ✓ | ReportRead |  |
| DeviceBasicRead |  | AddressBookWrite |  | DeviceAdvancedWrite | ✓ | ReportWrite |  |

[Save]    [Cancel]    [Help]

Fig. 11

| | Full Admin | Device Basic Admin | Device Admin | Device Operator | Address Book Admin | Security Admin | User Admin | Reports Admin | Reports User | Customer Engineer |
|---|---|---|---|---|---|---|---|---|---|---|
| AddressBookRead | ✓ | ✓ | ✓ | ✓ | ✓ | | | | | |
| AuditRead | ✓ | | | | | ✓ | | | | |
| SysConfigRead | ✓ | ✓ | ✓ | ✓ | ✓ | ✓ | | | | |
| DeviceBasicRead | ✓ | ✓ | ✓ | ✓ | ✓ | | | | | |
| DeviceAdvancedRead | ✓ | ✓ | ✓ | ✓ | | | | | | |
| Public | ✓ | ✓ | ✓ | ✓ | ✓ | ✓ | ✓ | ✓ | ✓ | ✓ |
| SecurityRead | ✓ | | | | | ✓ | ✓ | | | |
| AddressBookWrite | ✓ | | ✓ | | ✓ | ✓ | | | | |
| AuditWrite | ✓ | | | | | ✓ | | | | |
| SysConfigWrite | ✓ | | | | | | | | | |
| DeviceBasicWrite | ✓ | ✓ | ✓ | | | | | | | |
| DeviceAdvancedWrite | ✓ | | ✓ | | | | | | | |
| SecurityWrite | ✓ | | | | | ✓ | ✓ | | | |
| TaskWrite | ✓ | ✓ | ✓ | | | | | | | |
| LogDelete | ✓ | | | | | ✓ | | | | |
| ReportRead | ✓ | | | | | | | ✓ | ✓ | |
| ReportWrite | ✓ | | | | | | | ✓ | | |
| CustomerEngineer | ✓ | | | | | | | | | ✓ |

Fig. 14

CUSTOMIZING SECURITY ROLE IN DEVICE MANAGEMENT SYSTEM, APPARATUS AND METHOD

TECHNICAL FIELD

This disclosure relates to tools (such as systems, apparatuses, methodologies, computer program products, etc.) for managing information technology devices, and more particularly, such tools that permit access to be governed by customized security roles.

BACKGROUND

In the current information age, information technology (IT) tools are extensively used in enterprises and other organizations in order to facilitate processing of documents and data. IT administrators typically have the responsibilities of monitoring and managing IT devices, such as computers, printers, scanners, multi-function devices (MFDs) and other network-connected or standalone devices.

Device management tools (such as application software, etc.) are available to IT administrators to assist the administrators to track, monitor and otherwise manage the devices, often from across a network. The number of IT devices connected to a network is generally increasing and, as a result, there is a trend that the number of IT administrators needed to administer and manage such devices within an organization is increasing as well.

The level of experience and assigned responsibilities can vary amongst such administrators. That is, it is often the case that an administrator will administer certain devices, but not other devices, within an organization. Further, while many organizations span multiple office locations, some administrators may be assigned the responsibility to administer to a single local office, while other administrators may have the responsibilities of supporting multiple offices.

Heretofore, the typical IT system provides standard categories (e.g., Users, Power Users, Administrators) of access.

There exists a need for an improved approach for customizing the access rights of administrators to manage devices in a network environment.

SUMMARY

Tools (for example, a system, an apparatus, application software, etc.) are described herein that can be adapted to customize access by an information technology (IT) administrator to IT assets in a networked system.

In an aspect of this disclosure, a role customizing unit or part of a device management tool provides a user interface including (i) a template selection part for a system administrator to select a particular security role to be cloned, from plural default security role templates, and (ii) a role modifying part for the system administrator to add one or more additional device privileges to the cloned security role or delete one or more undesirable privileges from the cloned security role, to create a modified security role. The modified security role can be registered as a new security role in the network system, and a user privileges management unit or part can assign access privileges of a specific user (or multiple users) to those associated with the new security role.

The role modifying part can be configured to operate in any one or combination of various ways. For example, such role modifying part can be configured to provide a list of candidate privileges from which the system administrator selects additional device privileges to be added to the cloned security role. As another example, after one security role template is selected, the role modifying part can be configured to provide a list of the plural default security role templates again, and upon selection of another security role template from the list, provides a list of device privileges associated with said another security role, for selection of additional device privileges to be added to the cloned security role. In another example, the role modifying part provides, upon selection of the particular security role template, a list of device privileges associated with the cloned security role, for selection of the one or more undesirable privileges to be deleted from the cloned security role.

In another aspect, a template selection part or user permits the system administrator to select two or more security roles from the plural default security role templates, and the role modifying part of the user interface provides a list of device privileges constituted by merging the device privileges of the selected security roles.

In another aspect, a role modifying part unit or part can be configured to add to, or delete from, the cloned security role a privilege to access (or even change) device settings of one or more of the plural devices in the network system.

In another aspect, a role modifying part unit or part can be configured to add to, or delete from, the cloned security role a privilege to read device capabilities information of a specified device.

In another aspect, a role modifying part unit or part can be configured to add to, or delete from, the cloned security role an additional device privilege to invoke an audit function to read activities information indicating the system (or device) access activities of a specified user.

In another aspect, a user privileges management unit or part can be configured to provide a privileges setting user interface that displays a list of users set to have the device privileges associated with the new security role, and to further customize a security role.

BRIEF DESCRIPTION OF THE DRAWINGS

The aforementioned and other aspects, features and advantages can be more readily understood from the following detailed description with reference to the accompanying drawings wherein:

FIG. 5A shows a sample device data, according to an exemplary embodiment;

FIG. 5B shows sample device settings information, according to an exemplary embodiment;

FIG. 5C shows sample device capabilities information, according to an exemplary embodiment;

FIG. 5D shows sample system access activities information, according to an exemplary embodiment;

FIG. 5E shows sample security role information, according to an exemplary embodiment;

FIG. 7B shows a sample screenshot of a user interface displayed to the user, according to an exemplary embodiment;

FIG. 7C shows a sample screenshot of a user interface displayed to the user, according to an exemplary embodiment;

FIG. 8A shows a sample screenshot of a user interface displayed to the user, according to an exemplary embodiment;

FIG. 8B shows a sample screenshot of a user interface displayed to the user, according to an exemplary embodiment;

FIG. 9A shows a sample screenshot of a user interface displayed to the user, according to an exemplary embodiment;

FIG. 10 shows a sample screenshot of a user interface displayed to the user, according to an exemplary embodiment;

FIG. 11 shows a sample screenshot of a user interface displayed to the user, according to an exemplary embodiment;

FIG. 14 shows a sample table storing security role information, according to an exemplary embodiment.

DETAILED DESCRIPTION

Figure 1:
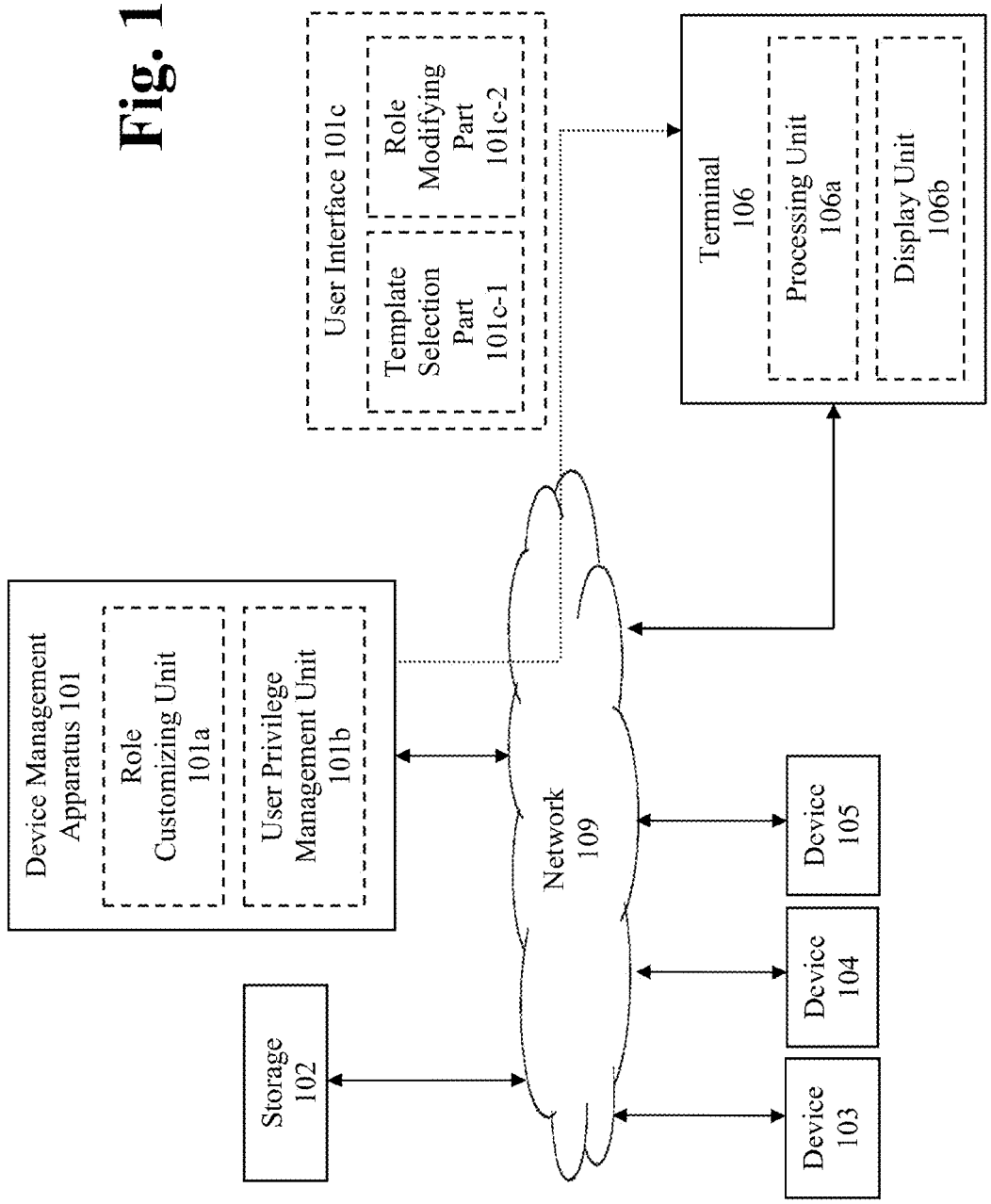
FIG. 1 shows a block diagram of a system for managing a plurality of network-connected devices, according to an exemplary embodiment.

In describing preferred embodiments illustrated in the drawings, specific terminology is employed for the sake of clarity. However, the disclosure of this patent specification is not intended to be limited to the specific terminology so selected and it is to be understood that each specific element includes all technical equivalents that operate in a similar manner. In addition, a detailed description of known functions and configurations will be omitted when it may obscure the subject matter of the present invention.

Referring now to the drawings, wherein like reference numerals designate identical or corresponding parts throughout the several views, there is described tools (systems, apparatuses, methodologies, computer program products, etc.) for managing information technology devices, such as computers, printers, scanners, multi-function devices, and other network-connected, or standalone, devices (such as a projector unit, a video conference device, a telephone conference device, a shredding device, a stamp device, etc.), and for managing one or more networks to which a plurality of such information technology devices are connected.

For example, FIG. 1 shows schematically a system 100 for managing a plurality of devices connected to a network, according to an exemplary embodiment. The system 100 includes a device management apparatus 101, a storage 102, a plurality of network-connected devices 103-105, and a terminal 106, all of which are interconnected by a network 109.

The device management apparatus 101 includes a role customizing unit 101a and a user privilege management unit 101b, and the terminal 106 includes a processing unit 106a and a display unit 106b.

The role customizing unit 101a is configured to provide a user interface 101c for customizing security roles (e.g. device admin, device operator, security admin, user admin, etc.) in the system 100 and the access level of each of the security roles. For example, the role customizing unit 101a causes the display unit 106b to display the user interface 101c. The user at the terminal 106 (e.g. an administrator of the network environment managed and monitored by the device management apparatus 101) can customize various security roles analyze the information (e.g. in the form of graphs and tables) displayed via the user interface 101c. The terminal 106 is further described infra with reference to FIG. 6B.

As shown in FIG. 1, the user interface 101c includes a template selection part 101c-1 and a role modifying part 101c-2.

The template selection part 101c-1 allows the user (e.g. a system administrator) to select a particular security role to be cloned, from plural default security role templates.

For example, such default security roles may include a "full administrator" who has full access to all the devices in the network system, a "device operator" who can view all information associated with a device in the network system, a "device basic administrator" who can read all information associated with a device and perform basic write operations, a "device administrator" who can read and write all information associated with a device, a "address book administrator" who can read all information associated with a device and create/update address book templates and tasks, a "user administrator" who can add users and security profiles to the system, a "security administrator" who can add users and security profiles to the system and read/write software audit logs, a "report administrator" who can run, create, save and schedule reports, a "report user" who can view created reports, and so forth. An example of the template selection part 101c-1 according to an exemplary embodiment is shown in FIG. 10 (which is further described infra), wherein the user is allowed to select a template (i.e. existing security role) from a list.

The role modifying part 101c-2 allows the user to add one or more additional device privileges to the cloned security role or delete one or more undesirable privileges from the cloned security role, to create a modified security role and register the modified security role as a new security role in the network system. As shown in the example of FIG. 11 (which is further described infra), the user is allowed to add or delete device privileges by checking or unchecking the corresponding checkboxes.

The privilege added to, or deleted from, the cloned security may be a privilege to access device settings of one or more devices in the network system. For example, "DeviceBasicRead" indicates that the user having this privilege is permitted to view the device capabilities of the devices in the network system.

Figure 8B:
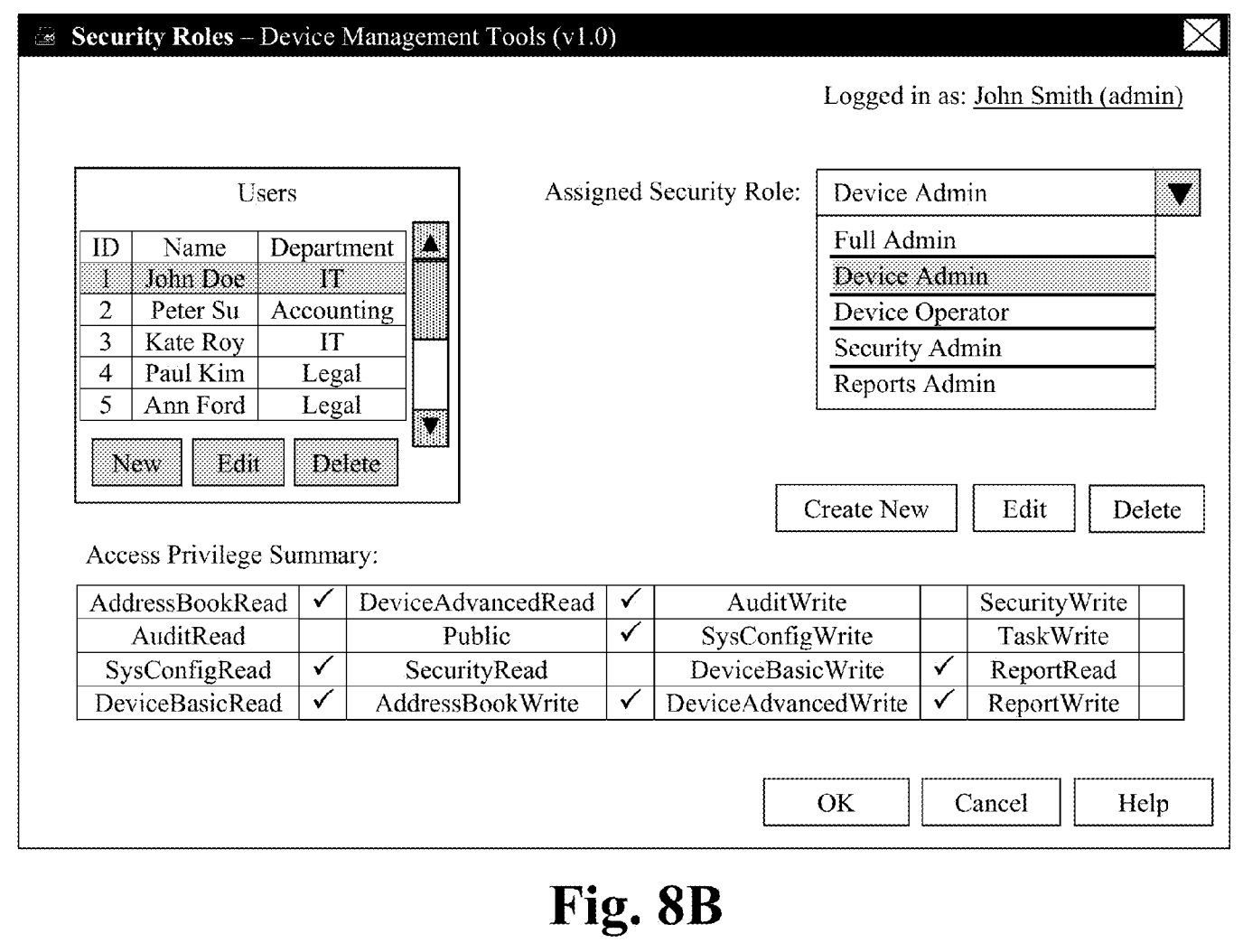

The user privileges management unit 101b is configured to set access privileges of a specific user to those associated with the new security role. For example, the user privileges management unit 101b may modify a database storing various user profiles and access privileges associated with each of the user profiles, to set the access privileges of a specified user to the privileges associated with the new security role. An example of access privileges of a user is shown in FIG. 8A, which is further described infra. In FIG. 8A, the user "John Doe" is assigned to the security role "device admin" which has certain privileges associated with the role as shown in the table at the bottom of the screen.

Each of such access privileges (e.g. device privileges) indicates an action that can be performed by users in the network environment. An example of such privileges is shown in FIG. 5E. For example, "AddressBookRead" indicates that a user can check the address book information found in a network device, and "AddressBookWrite" indicates that the user can create an address book template and apply the template to other devices and copy the address book from a device and distribute it to other devices; "AuditRead" indicates that the user can view the audit result (e.g. a recording of a user's activity in the network management system, such as who, when, how, user login/logout, addition/modification/deletion of devices and device groups, templates, tasks, system settings, user accounts, notification settings, etc.) and "AuditWrite" indicates that the user can remove the audit result from the system; "SysConfigRead" indicates that the user can see the system settings, and "SysConfigWrite" indicates that the user can set the system settings; "DeviceBasicRead" indicates that the user can see all the device capabilities and device groups, and "DeviceBasicWrite" indicates that the user can add, modify or delete devices and device groups; "DeviceAdvancedRead" indicates that the user can read or write the configuration templates and tasks associated with devices, such as device settings templates, device cloning templates, address book templates, embedded application templates, and so forth; "public" is the privilege required for all roles, and allows the user to perform generic operations with no security implications; "SecurityRead" indicates that the user can view the security settings (e.g. security settings of the device management application), and "SecurityWrite" indicates that the user can set the security settings; "LogDelete" indicates that the user can delete all kinds of logs maintained in the system, such as system log, task log, audit log, notification log, device job logs, device access logs, device ecology logs, etc.; "ReportRead" indicates that the user can view the reports (e.g. device summary report, device counters report, device status report, device ecology report, user accounting report, etc.) created by another user, and "ReportWrite" indicates that the user can generate such reports; "CustomerEngineer" indicates that the user can change the special system settings that are only allowed to be changed by a customer engineer.

"ReportRead" indicates that a user having the privilege is allowed to read reports created in the network environment (e.g. error report, etc.), and "ReportWrite" indicates that a user having the privilege is allowed to create or modify such reports. The access privileges available in the network environment is not limited to those discussed in the present disclosure, and may include any actions that can be performed by users in the network environment.

Referring back to FIG. 1, the storage 102 may store device data (FIG. 5A), device settings information (FIG. 5B), device capabilities information (FIG. 5C) collected from the devices 103-105, access privileges of various security roles (FIG. 14), system access activities information (FIG. 5D), security role information (FIG. 5E) user profiles of various users in the network environment, and any other data or files needed for the operation of the device management unit 101.

The network-connected devices 103-105 may include, for example, a printer, a scanner and/or a multi-function device (MFD). While this example of this disclosure simply refers to network-connected devices 103-105 in the interest of brevity, the aspects of this disclosure are applicable to a network environment having an arbitrary number of devices.

The network 109 can be a local area network, a wide area network or any type of network such as an intranet, an extranet (for example, to provide controlled access to external users, for example through the Internet), the Internet, etc., or a combination thereof. Further, other communications links (such as a virtual private network, a wireless link, etc.) may be used as well for the network 109. In addition, the network 109 preferably uses TCP/IP (Transmission Control Protocol/Internet Protocol), but other protocols such as SNMP (Simple Network Management Protocol) and HTTP (Hypertext Transfer Protocol) can also be used. How devices can connect to and communicate over networks is well-known in the art and is discussed for example, in "How Networks Work", by Frank J. Derfler, Jr. and Les Freed (Que Corporation 2000) and "How Computers Work", by Ron White, (Que Corporation 1999), the entire contents of each of which are incorporated herein by reference.

Figure 2:
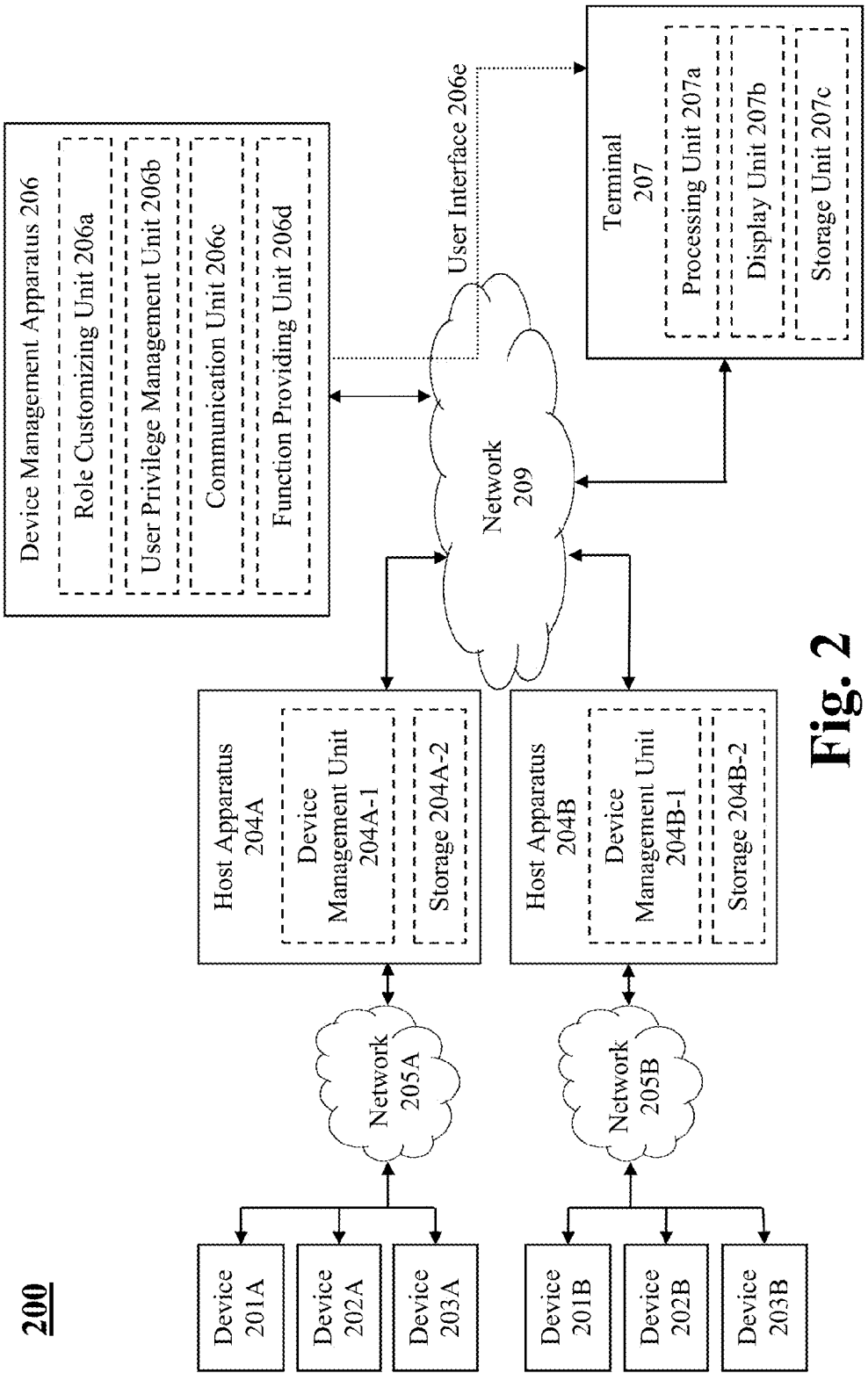
FIG. 2 shows a block diagram of a system for managing a plurality of network-connected devices, according to another exemplary embodiment.

For example, FIG. 2 shows schematically a system 200 for managing a plurality of devices connected to a network, according to an exemplary embodiment. The system 200 includes devices (i.e. network-connected devices) 201A-203A and a device management (DM) unit 204A-1 installed on a host apparatus 204A including a storage 204A-2, all of which are interconnected by a network 205A ("Network A"); devices 201B-203B and a device management unit 204B-1 installed on a host apparatus 204B including a storage 204B-2, all of which are interconnected by a network 205B ("Network B"); a core management apparatus 206 and a terminal 207, both of which are interconnected by a network 209 ("Network C"). The host apparatuses 204A and 204B are also connected to the network 209.

The devices 201A-203A and 201B-203B may include, for example, a printer, a scanner, a terminal and/or a multi-function device (MFD). While this example of this disclosure simply refers to devices 201A-203A and 201B-203B in the interest of brevity, the aspects of this disclosure are applicable to a network environment having an arbitrary number of devices. An exemplary configuration a network device as an MFD is described infra with reference to FIG. 6C.

The device management units 204A-1 and 204B-1, each of which are implemented on the corresponding host apparatus, are configured to manage and collect device data from the devices in the system 200. In particular, each of the device management units 204A-1 and 204B-1 may be responsible for managing and collecting data from a subset of the devices in the system 200. For example, as shown in FIG. 2, the device management unit 204A-1 manages and collects device data from the devices 201A-203A, and the device management unit 204B-1 manages and collects device data from the devices 201B-203B. The device data collected by the device management units 204A-1 and 204B-1 may respectively be stored in internal storage units therein, external storage units connected thereto, or storage units accessible via the networks 205A and 205B.

An example of device data collected by the device management units 204A-1 and 204B-1 from the devices 201A-203A and 201B-203B is illustrated in FIG. 5A. As seen in FIG. 5A, the device data for each device may include a variety of attributes such as name, manufacturer, IP address, device age, status, firmware version and department. The information depicted in FIG. 5A is merely exemplary, and other network devices, device status information, device properties, device configuration information, and so forth, may be included in the device data collected by the data management units. As non-limiting examples, the device data may include one or more of the following for a given network device: device manufacturer; device model; device serial number; device type (printer, scanner, terminal, etc.); device location (physical address, geographic address, network address, IP address, MAC address, etc.); output technology (e.g., laser, inkjet solid ink, thermal, other technology, etc.); device location type (e.g., production/copy center, in a specific workgroup area, etc.); scope (e.g., within the scope of administrative responsibility of a particular IT administrator, outside the scope of administrative responsibility of particular IT administrator, etc.); connection type (e.g., network connected, workstation/local connected, non-connected, etc.); device age (e.g., <1 year, 1-2 years, 2-3 years, 3-4 years, 4-5 years, >5 years, etc.); functions (e.g., copy, fax, print, scan, copy/scan, copy/fax, copy/print, print/fax, print/scan, copy/print/fax, copy/print/scan, copy/print/fax/scan, etc.); firmware version (e.g., major version, minor version, etc.); installed applications (e.g., application name, major version, etc.); organization (e.g., different groups, sub-groups, levels, departments, divisions and so forth within a larger enterprise or institutional entity, such as management group, sales group, marketing group, research & development group, etc.); supply level (e.g., consumable types such as paper and toner >empty/low/ok, etc.); capability (e.g., color, economy color, monochrome only, color scan, duplex, A3, not A3, etc.); last status update (e.g., 10 minutes, 60 minutes, 6 hours, etc.); duplex usage (e.g., 2:1, 1:2, 2:2, Book Duplex, etc.); paper size usage (e.g., A3, A4, B4, etc.); pages per job (e.g., 1, 2, 6-10, etc.); pages per minute (PPM) range (e.g., 1-20 ppm, 41+ ppm, etc.); color technology (e.g., professional color, convenience color, etc.); audit results/analysis (e.g., devices which satisfied a particular audit or test, devices which did not satisfy a particular audit or test, etc.); and so forth.

The device data collected by the device management units 204A-1 and 204B-1 may also include error history information that includes a log of all errors occurring at the corresponding managed device, and usage history information indicating which users have the utilized the managed device and when such use has occurred. The usage history information may indicate, for example, a number of total impressions (e.g. pages) produced by a user, or a number of specific types of impressions (copy color, copy BW, print color, print BW, etc.) produced by a user.

The device management units 204A-1 and 204B-1 communicate with one or more of the plurality of network-connected devices to collect and obtain the various device data corresponding to each device. Many printers and other devices store data indicating their attributes or properties in a Management Information Base (MIB). The MIB may conform with the SNMP (Simple Network Management Protocol) protocol, and properties information can be obtained directly from the MIB through SNMP queries. In this way, the device management units 204A-1 and 204B-1 are configured to discover and/or poll the corresponding plurality of network devices to obtain the device data from the network devices.

The device management units 204A-1 and 204B-1 may obtain the device data (such as the name, status, configuration information, error history, usage history, etc.) from each network device by monitoring a network to which the device is connected (i.e. networks 205), and detecting and receiving one or more alert notifications or status updates transmitted to the network from any of the plurality of network-connected devices 201-203. For example, the device management units 204A-1 and 204B-1 may receive the status updates by repeatedly transmitting requests to the network-connected devices 201-203 via the networks 205, inquiring as to the status of each network device. In response, each network device may transmit status updates back to the corresponding device management unit, wherein each status update indicates the device name, status, configuration information, error history, usage history, whether an error exists or has occurred at the network device, etc. Alternatively, each network-connected device may automatically transmit status updates to the corresponding device management unit (without waiting for requests or queries from the device management unit), at regular intervals or whenever an error occurs at the network-connected device. The device management units 204A-1 and 204B-1 may include locally resident hardware and/or software agents installed locally on each of the devices 201-203, which are configured to transmit the status updates directly to the corresponding device management unit. The device data may be stored along with other data in one or more storage units external to the device management units 204A-1 and 204B-1, or alternatively, in one or more storage units resident in the device management units 204A-1 and 204B-1 and retrieved as needed.

The device management units 204A-1 and 204B-1 may also collect device settings information from the devices 201-203. Such device settings information according to an exemplary embodiment is shown in FIG. 5B. As seen in FIG. 5B, the device settings information for each network-connected device may include a variety of attributes such as setting name, setting type, default value of the setting, and the options selectable for the setting. The information depicted in FIG. 5B is merely exemplary, and a wide range of other device preference settings, such as network settings, authentication settings, log settings, image settings, print settings and etc., may be included in the device settings information collected by the data settings management units. As non-limiting examples, "device group" indicating the group to which the particular network-connected device belongs in a network environment, "SNMPv3" indicating whether SNMPv3 (Simple Network Management Protocol, version 3) is enabled, "reception protocol" indicating a protocol used for e-mail reception, "memory overflow" indicating an action to perform in the event of a memory overflow (e.g. do not print), "toner saving" indicating whether a toner saving mode is enabled, "firmware update" indicating whether firmware update is permitted, and so forth.

In a similar manner, the device management units 204A-1 and 204B-1 may collect device capabilities information which indicates the various tasks that can be performed by the devices in the network environment, as shown in FIG. 5C.

Further, the device management units 204A-1 and 204B-1 may record all the user activity (e.g. accessing device information, modifying device settings, etc.) in the network environment. As shown in FIG. 5D, the system access activities information indicating the date of activity, the user performing the activity, IP address of the user, the particular action performed, and the connection type, may be maintained by the device management units 204A-1 and 204B-1. Although the system access activities information is shown in the form of a table, the system access activities information maintained by the device management units 204A-1 and 204B-1 (or the device management apparatus 206) can also take the form of a log, which keeps a running list of system access activities. The information logged is not limited to that shown in the example of FIG. 5D, and any other details regarding the particular actions performed by the users in the network environment may be recorded in the log.

Additionally, a security role information (e.g. in the form of a database) may be maintained by the device management units 204A-1 and 204B-1 and/or the device management apparatus 206. As shown in FIG. 5E, such security role information may include all the security roles available in the network environment and the corresponding privileges.

Such information (e.g. such as shown in FIGS. 5A-5E) collected and/or maintained by the device management units 204A-1 and 204B-1 and/or the device management apparatus 206 can be stored in internal storage units resident in the host apparatuses 204 (e.g. storages 204A-2 and 204B-2) and/or the device management apparatus 206. Alternatively, the information can be stored in a storage unit connected to the host apparatuses 204, the device management apparatus 206 and/or the terminal 207, or in a storage unit accessible via the network 209, and retrieved as needed. For example, the information may be stored in one or more databases [e.g. off-the-shelf database applications based on SQL (Structured Query Language), or other customized database applications with search/query function]. If the information is stored in more than one location, the information may be synced, for example, periodically or upon a user request.

Referring back to FIG. 2, the networks 205A and 205B may, for example, each represent an intranet for a particular office of an enterprise, which has an enterprise network (e.g. network 209) connecting each of the intranets.

Although the networks 205A, 205B and 209 are illustrated as being separate networks, the system 200 is not limited to such configuration, and any of the networks shown in FIG. 2 may be combined and/or separated, and the system 200 may include any arbitrary number of networks.

As shown in FIG. 2, the device management apparatus 206 includes a role customizing unit 206a, a user privilege management unit 206b, a communication unit 206c and a function providing unit 206d.

The operations of the role customizing unit 206a and the user privilege management unit 206b are similar to those discussed supra in connection with FIG. 1.

The communication unit 206c allows the device management apparatus 206 to communicate through the network 209, such as with the device management units 204A-1 and 204B-1 and the terminal 207.

In another exemplary embodiment, the communication unit 206c is also configured to communicate with any particular device amongst plural heterogeneous devices that may be included in the system 200 in a communication format native to the particular device. For example, in the system 200, the communication unit 206c may be configured to communicate with each of the devices 201-203 (including any other device management units, terminals and/or other devices that may be connected to the network 209) in a communication format established by the respective manufacturers/vendors of such devices. The communication unit 206c may determine an appropriate communication format native to the particular device by any of various known approaches. For example, the communication unit 206c may refer to a database or table, maintained internally or by an outside source, to determine an appropriate communication format native to the device. As another example, the communication unit 206c may access an Application Program Interface (API) of the particular device, in order to determine an appropriate communication format native to the device.

The function providing unit 206d provides one or more device management functions such as reading device capabilities information of a specified device, changing system settings of a specified device, reading activities information indicating system access activities of a specified user, and so forth. The device management functions provided by the function providing unit 206d can include any functions typically provided by a device management system.

Figure 9A:
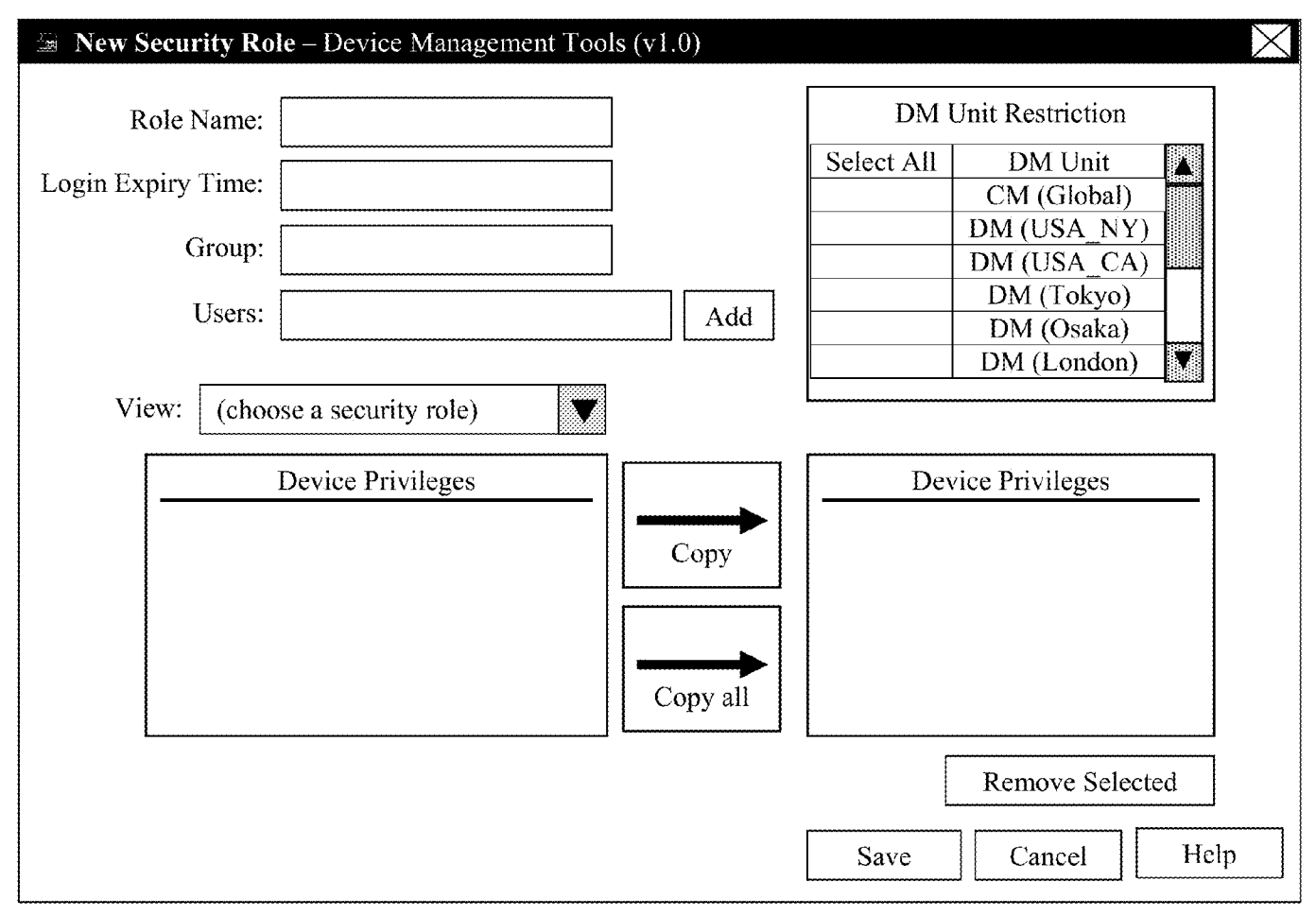

As shown in FIG. 2, the device management apparatus 206 provides a user interface 206e to the terminal 207. The user interface 206e is similar to that discussed supra in connection with FIG. 1. The user interface 206e may additionally include a system restriction part, which allows the user at the terminal 207 to specify restrictions of a new security role to device management functions of one or more selected device management units amongst the plurality of device management units. For example, as shown in the example of FIG. 9A (which is further described infra), one or more device management units in the network environment can be selected to restrict the new security role to the device management functions provided by such selected device management units.

As shown in FIG. 2, the terminal 207 includes a processing unit 207a, a display unit 207b and a storage unit 207c. For example, the role customizing unit 206a causes the processing unit 207a to execute a device management application (e.g. stored in the storage unit 207c), which causes the display unit 207b to display a user interface 206d. The user at the terminal 207 (e.g. an administrator of the network environment managed and monitored by the device management apparatus 206) can manage the plurality of device management units assigned to the device management apparatus 206, via the user interface 206e.

The storage unit 207c may also store any information (e.g. device data, device settings information, etc.) received from the devices 201-203, the host apparatuses 204 and the device management apparatus 206. The terminal 207 is further described infra with reference to FIG. 6B.

Each of the network connections 205 and 209 can include one or more connections via a secure intranet or extranet, a local area network (LAN), a wide area network (WAN) or any type of network such as an intranet, an extranet (for example, to provide controlled access to external users, for example through the Internet), the Internet, etc., or a combination thereof. Further, other communications links (such as a virtual private network, a wireless link, etc.) may be used as well for the networks 205 and 209. In addition, the networks 205 and 209 preferably use TCP/IP (Transmission Control Protocol/Internet Protocol), but other protocols such as SNMP (Simple Network Management Protocol) and HTTP (Hypertext Transfer Protocol) can also be used. How devices can connect to and communicate over networks is well-known in the art and is discussed for example, in "How Networks Work", by Frank J. Derfler, Jr. and Les Freed (Que Corporation 2000) and "How Computers Work", by Ron White, (Que Corporation 1999), the entire contents of each of which are incorporated herein by reference. Although the devices 201-203 depicted in FIG. 2 are shown as being connected to one or more networks, the aspects of this disclosure may be applied to a system for managing a device that is not connected to a network but utilizes instead point-to-point communication, such as radio-frequency identification (RFID) technology. Such technology is well-known in the art and a description thereof is omitted in the interest of brevity.

Figure 3:
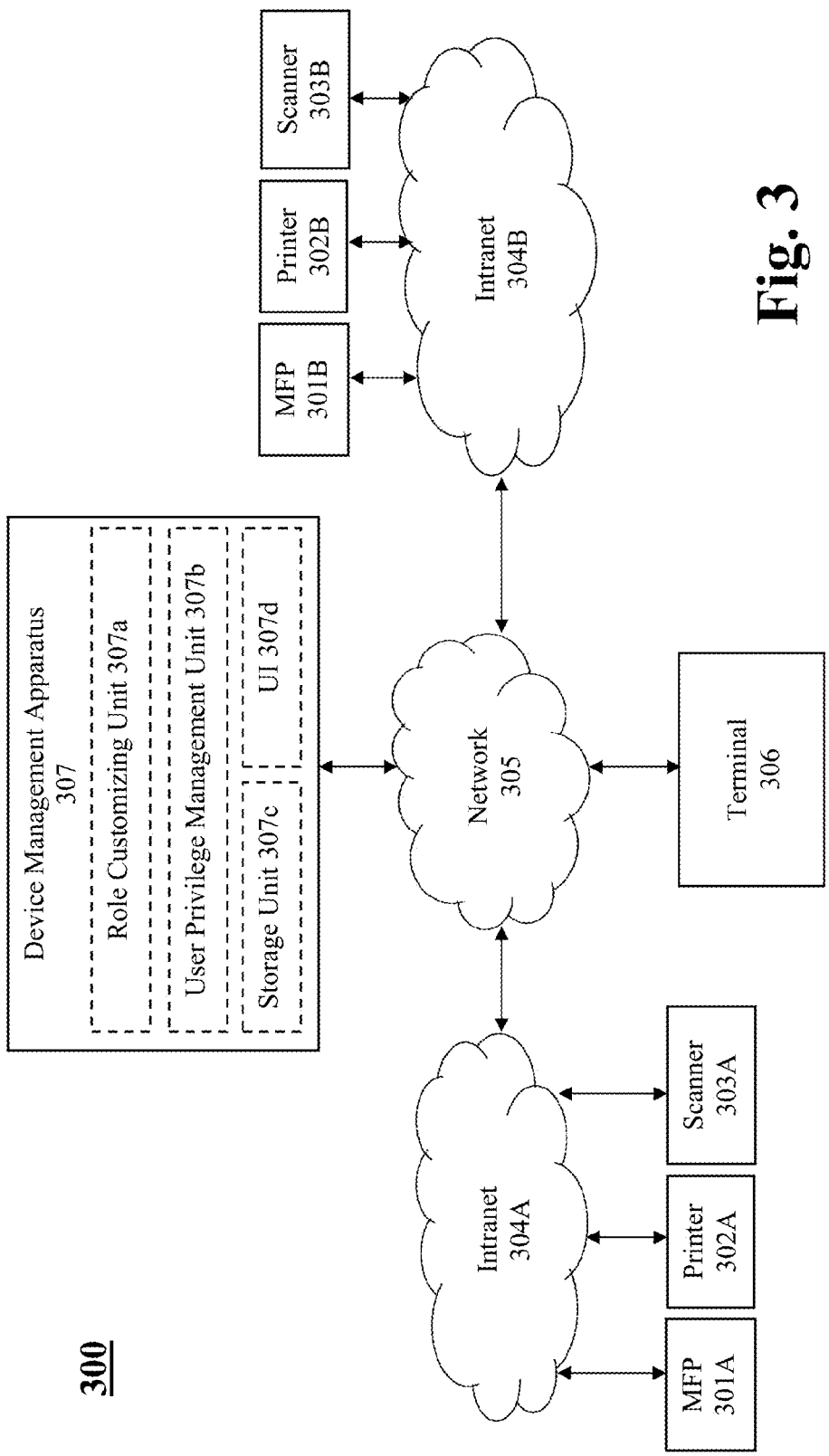
FIG. 3 shows a block diagram of a system for managing a plurality of network-connected devices, according to another exemplary embodiment.

With reference to FIG. 3, a system for managing a plurality of network-connected devices, according to another exemplary embodiment, is described below.

The example of FIG. 3 includes a system 300 which includes an MFP 301A, a printer 302A and a scanner 303A, all of which are interconnected by an intranet 304A (collectively "Network A"); an MFP 301B, a printer 302B and a scanner 303B, all of which are interconnected by an intranet 304B (collectively "Network B"); and a terminal 306 and a device management apparatus 307, which are interconnected by a network 305. The network 305 is connected to the intranets 304A and 304B. The device management apparatus 307 includes a role customizing unit 307a, a user privilege management unit 307b, a storage unit 307c and a user interface 307d.

For example, each of the Networks A and B respectively connected by the intranets 304A and 304B may represent a regional office of a global or national enterprise having multiple regional offices.

In the example of FIG. 3, the user interface 307d via which the user may customize the security roles of the users in the network environment is provided on the device management apparatus 307. Further, the storage unit 307c is resident in the device management apparatus 307.

Otherwise, operations of the elements of the system 300 are similar to those discussed in connection with the corresponding elements of the system 100 of FIG. 1.

Figure 4:
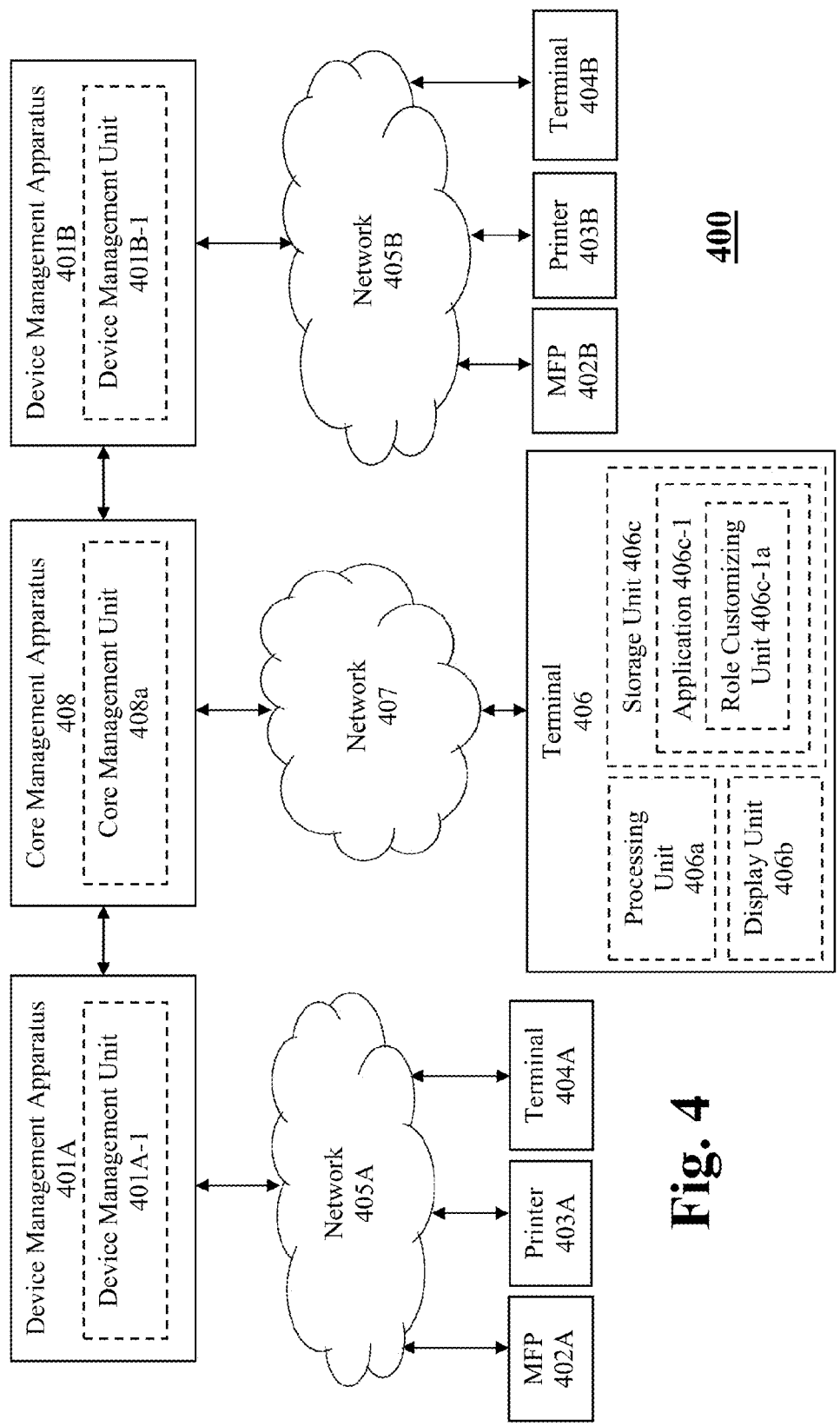
FIG. 4 shows a block diagram of a system for managing a plurality of network-connected devices, according to another exemplary embodiment.

With reference to FIG. 4, a system for managing a plurality of network-connected devices, according to another exemplary embodiment, is described below.

The example of FIG. 4 includes a system 400 which includes a device management apparatus 401A including a device management unit 401A-1, an MFP 402A, a printer 403A and a terminal 404A, all of which are interconnected by a network 405A (collectively "Network A"); a device management apparatus 401B including a device management unit 401B-1, an MFP 402B, a printer 403B and a terminal 404B, all of which are interconnected by a network 405B (collectively "Network B"); a terminal 406 and a core management apparatus 408 including a core device settings management unit 408a, which are interconnected by a network 407 (collectively "Network C"). The core management apparatus 408 is connected to the device settings management apparatuses 401A and 401B.

Each of terminals 404A and 404B may be a user terminal via which a user interface for managing the network-connected devices in the respective networks 405A and 405B is displayed. For example, when the user at the terminal 404A may view device data associated with the MFP 204A and the printer 403A, and modify device settings of the MFP 402A and the printer 403A.

The terminal 406 includes a processing unit 406a, a display unit 406b and a storage unit 406c. The operations of the processing unit 406a and the display unit 406b are similar to those of the processing unit 106a and the display unit 106b discussed in connection with FIG. 1, respectively. The storage unit 406c includes an application 406c-1 having a role customizing unit 406c-1a. Upon the execution of the device management application 406c-1 by the processing unit 406a, a user interface similar to that described with reference to FIG. 1 is displayed on the display unit 406b. The user (e.g. administrator) at the terminal 406 may customize the security roles (e.g. device admin, device operator, security admin, user admin, etc.) of the various users of the network environment via the user interface, in the manner described supra in connection with FIG. 1.

For example, the user at the terminal 404A may be a user at the local office of an enterprise, each of Networks A and B representing a separate office, and the user at the terminal 406 may be an administrator who is responsible for managing the entire enterprise network and authorized to remotely configure device settings on the network-connected devices in multiple regional networks and customize security roles of the various users of the network environment.

The core management unit 408a and/or the device management units 401A-1 and 401B-1 may be realized by a computer program product including a computer-usable, non-transient medium (such as a disk storage apparatus) having instructions tangibly embodied therein that are executed by a computer. Thus, it should be understood that the core management unit 408a and/or the device management units 401A-1 and 401B-1 may be executed on a computer. While the core management unit 408a and/or the device management units 401A-1 and 401B-1 are shown as being external to the network devices, the core management unit 408a and/or the device management units 401A-1 and 401B-1 may in fact be executed on a client terminal and/or network-connected device.

The core management apparatus 408 and/or the device management apparatuses 401 may include a data store that can comprise one or more structural or functional parts that have or support a storage function. For example, the data store can be, or can be a component of, a source of electronic data, such as a document access apparatus, a backend server connected to a document access apparatus, an e-mail server, a file server, a multi-function peripheral device (MFP or MFD), a voice data server, an application server, a computer, a network apparatus, a terminal etc. It should be appreciated that the term "electronic document" or "electronic data", as used herein, in its broadest sense, can comprise any data that a user may wish to access, retrieve, review, etc.

As an example, the core management unit 408a may be used by a super administrator who is in charge of managing an entire enterprise network which may include plural regional networks. In contrast, each local administrator may be in charge of managing one of such plural regional networks via the device management units 401A-1 and 401B-1.

Otherwise, operations of the elements of the system 400 are similar to those discussed in connection with the corresponding elements of the system 100 of FIG. 1.

In the example of FIG. 4, only three networks (Networks A-C) are shown in the interest of brevity, but the system 400 is not limited to such configuration. The core management apparatus 408 may be connected to any arbitrary number of device management apparatuses 401 and other devices (e.g. terminal 406).

Also, how the core management apparatus 408, device management apparatuses 401 and terminal 406 are connected is not limited to the configuration shown in FIG. 4. For example, the core management apparatus may be connected to one or more device management units which are connected to one or more network devices and/or further device management units for managing other network devices. Each of the core management unit 408a and the device management units 401A-1 and 401B-1 may be implemented on a host computer, a network device (e.g. MFD), a terminal, or any other device including a processor and a non-transitory computer-readable storage medium.

For example, a super administrator who oversees the entire network environment should have access to all devices in the network environment and privileges to read and write to any of such devices. On the other hand, the access level of a local administrator should be limited to the devices in the local network which the local administrator oversees, and not extend to other networks not managed by the local administrator. Thus, in the aspects of the present disclosure, different users having different roles in the network environment can be assigned different security roles customized specifically for their roles.

Figure 6A:
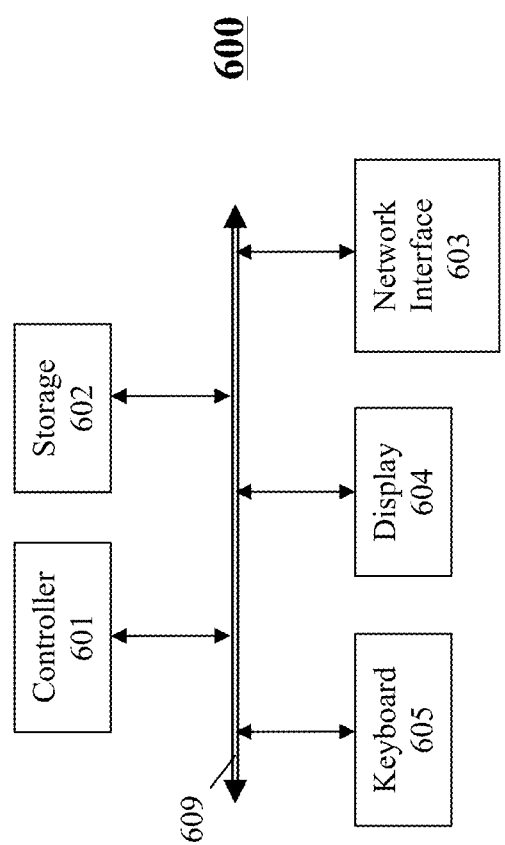
FIG. 6A shows a block diagram of an exemplary configuration of a device management apparatus, according to an exemplary embodiment.

FIG. 6A shows an exemplary configuration of a computing device that can be configured (for example, through software) to operate (at least in part) as the core management apparatus 408 of FIG. 4 and/or device management apparatuses 401 illustrated in FIG. 4. As shown in FIG. 6A, the management unit 600 includes a controller (or central processing unit) 601 that communicates with a number of other components, including memory or storage part 602, network interface 603, display 604 and keyboard 605, by way of a system bus 609.

The management unit 600 may be a special-purpose device (such as including one or more application specific integrated circuits or an appropriate network of conventional component circuits) or it may be software-configured on a conventional personal computer or computer workstation with sufficient memory, processing and communication capabilities to operate as a terminal and/or server, as will be appreciated to those skilled in the relevant arts.

In the management unit 600, the controller 601 executes program code instructions that control device operations. The controller 601, memory/storage 602, network interface 603, display 604 and keyboard 605 are conventional, and therefore in order to avoid occluding the inventive aspects of this disclosure, such conventional aspects will not be discussed in detail herein.

The management unit 600 includes the network interface 603 for communications through a network, such as communications through the network 109 with the network-connected devices 103-105 in FIG. 1. However, it should be appreciated that the subject matter of this disclosure is not limited to such configuration. For example, the management unit 600 may communicate with client terminals through direct connections and/or through a network to which some components are not connected. As another example, the management unit 600 does not need to be provided by a server that services terminals, but rather may communicate with the devices on a peer basis, or in another fashion.

The core management units and/or the device management units of the present disclosure are not limited to a server or computer, but can be manifested in any of various devices that can be configured to communicate over a network and/or the Internet.

Figure 6B:
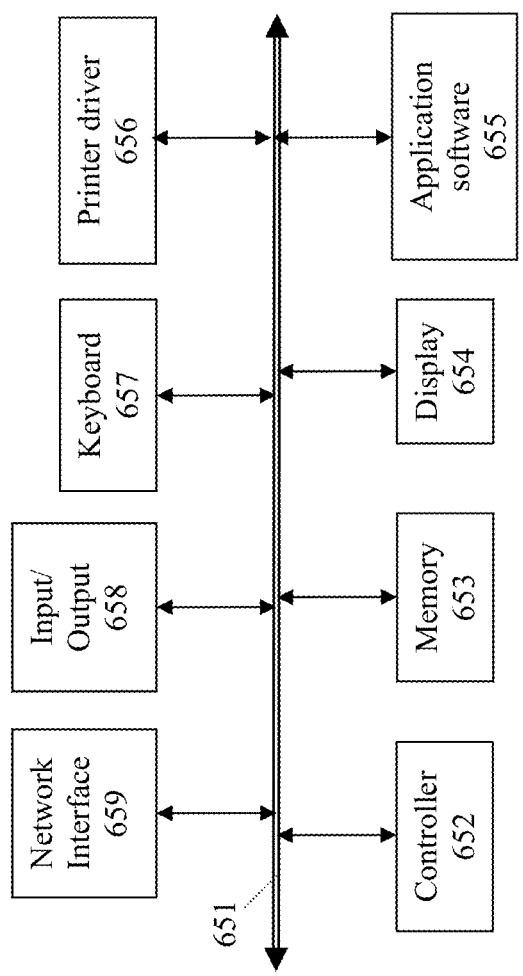
FIG. 6B shows a block diagram of an exemplary configuration of a terminal, according to an exemplary embodiment.

An example of a configuration of the terminal 106 of FIG. 1 and/or the terminals 404 of FIG. 4 (for example, as a computer) is shown schematically in FIG. 6B. In FIG. 6B, computer 650 includes a controller (or central processing unit) 652 that communicates with a number of other components, including memory 653, display 654, keyboard (and/or keypad) 657, other input/output (such as mouse, touchpad, stylus, microphone and/or speaker with voice/speech interface and/or recognition software, etc.) 658, network interface 659, print driver 656 and application software 655, by way of an internal bus 651.

The memory 653 can provide storage for program and data, and may include a combination of assorted conventional storage devices such as buffers, registers and memories [for example, read-only memory (ROM), programmable ROM (PROM), erasable PROM (EPROM), electrically erasable PROM (EEPROM), static random access memory (SRAM), dynamic random access memory (DRAM), non-volatile random access memory (NOVRAM), etc.].

The network interface 659 provides a connection (for example, by way of an Ethernet connection or other network connection which supports any desired network protocol such as, but not limited to TCP/IP, IPX, IPX/SPX, or NetBEUI) to the network to which the computer 650 is connected (e.g. network 109 of FIG. 1).

Print driver 656 and application software 655 are shown as components connected to the internal bus 651, but in practice are typically stored in storage media such as a hard disk or portable media, and/or received through the network, and loaded into memory 653 as the need arises.

Depending on the type of the particular terminal device, one or more of the components shown in FIG. 6B may be missing. For example, a particular mobile phone may be missing the print driver 656 and the keyboard 657.

Additional aspects or components of the computer 650 are conventional (unless otherwise discussed herein), and in the interest of clarity and brevity are not discussed in detail herein. Such aspects and components are discussed, for example, in "How Computers Work", by Ron White (Que Corporation 1999), and "How Networks Work", by Frank J. Derfler, Jr. and Les Freed (Que Corporation 2000), the entire contents of each of which are incorporated herein by reference.

Each of the network-connected devices 103-105 of FIG. 1 (or other network-connected devices described in the present disclosure) may be any device including but not limited to a personal, notebook or workstation computer, a terminal, a kiosk, a personal digital assistant (PDA), a tablet computing device, a smartphone, a scanner, a printer, a facsimile machine, a multi-function device (MFD), a server, a mobile phone or handset, another information terminal, etc. Each network-connected device may be configured with software allowing the network-connected device to communicate through a network with a device management unit and/or a core management unit described in the present disclosure.

Figure 6C:
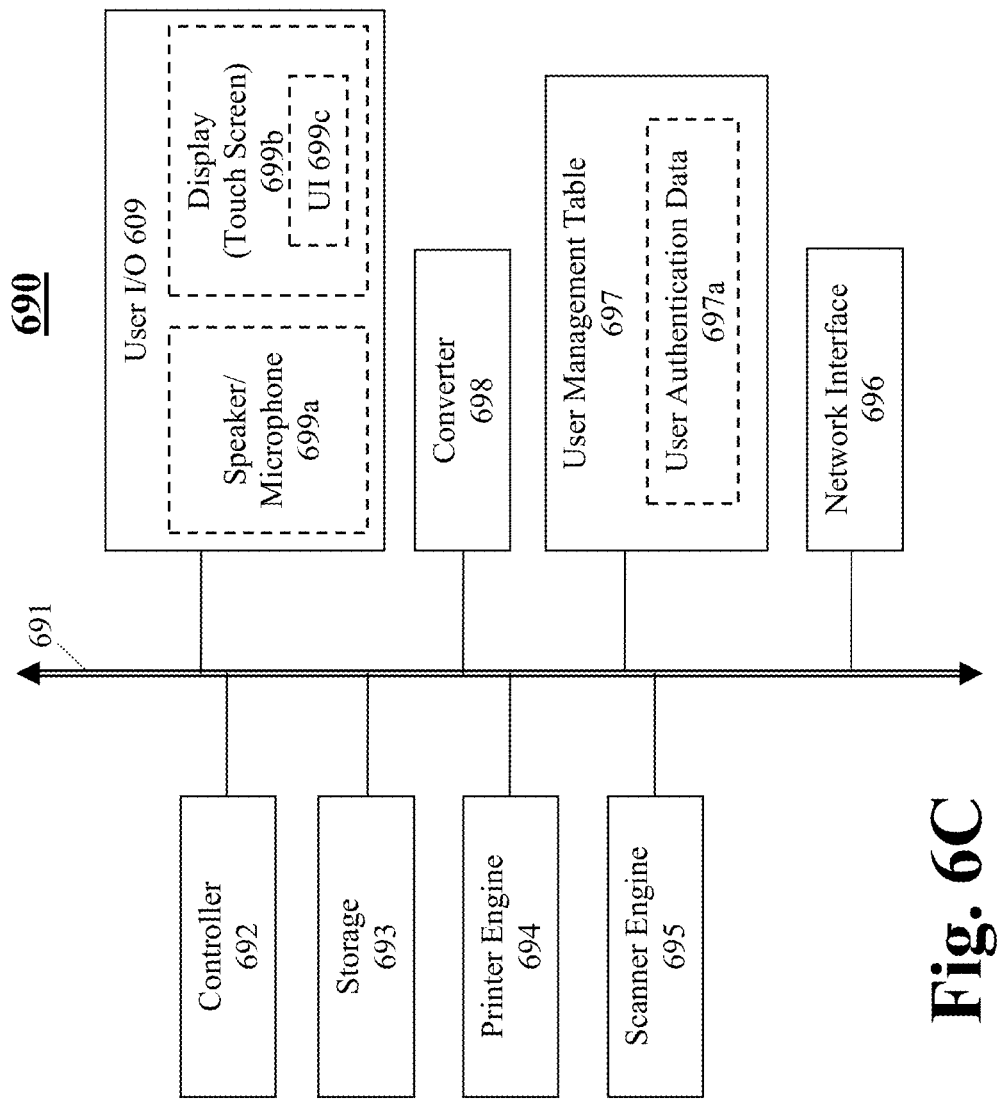
FIG. 6C shows a block diagram of an exemplary configuration of a multi-function peripheral device, according to an exemplary embodiment.

FIG. 6C shows a schematic diagram of a configuration of a network-connected device as an MFD, according to an exemplary embodiment, which can be any apparatus (including a microprocessor chip or a collection of devices having varying degree of integration) that has the ability to perform two or more functionalities.

The MFD 690 shown in FIG. 6C includes a controller 692, and various elements connected to the controller 692 by an internal bus 691. The controller 692 controls and monitors operations of the MFD 690. The elements connected to the controller 692 include storage 693 (for example, random access memory, read-only memory, hard disk drive, portable storage media drive such as for optical discs, magnetic discs, magneto-optical discs, etc., semiconductor memory cards, combinations of storage media, etc.), printer engine 694, scanner engine 695, network interface (I/F) 696, converter 698 for converting data from one format to another format (for example, a format suitable for printing, faxing, e-mailing, etc.), and user I/O (Input/Output) 699. The controller 692 also utilizes information stored in user management table 697 to authenticate the user and control user access to the functionalities of the MFD 690.

Storage 693 can include one or more storage parts or devices [e.g. a read only memory (for example, ROM, PROM, EPROM, EEPROM, etc.), a random access memory (RAM), a hard disk drive (HDD), portable media (for example, floppy disk, optical disc, magnetic discs, magneto-optical discs, semiconductor memory cards, etc.) drives], and program code instructions can be stored in one or more parts or devices of storage 693 and executed by the controller 692 to carry out the instructions. Such instructions can include instructions for performing specified functions (such as printing, scanning, faxing, copying, e-mailing, etc.) of the MFD 690, to enable the MFD 690 to interact with a terminal, as well as perhaps other external devices, through the network interface 696, and to control the converter 698, access data in the user management table 697, and interactions with users through the user I/O 699.

The network interface 696 is utilized by the MFD 690 to communicate with other network-connected devices such as a terminal or a device management apparatuses (e.g., device management apparatus 101 of FIG. 1) and receive data requests, print jobs, user interfaces, and etc.

The user I/O 699 includes one or more display screens that display, under control of controller 692, information allowing the user of the MFD 690 to interact with the MFD 690. The display screen can be any of various conventional displays (such as a liquid crystal display, a plasma display device, a cathode ray tube display, etc.), but preferably is equipped with a touch sensitive display (for example, liquid crystal display) and is configured to provide a GUI (graphical user interface) based on information input by an operator of the MFD 690, so as to allow the operator to interact conveniently with services provided on the MFD 690, or with the MFD 690 serving as terminal for accessing electronic data or other content through the network. User interfaces or other contents received through the network via the network interface 696 can be displayed on the display screen.

The display screen does not need to be integral with, or embedded in, a housing of the MFD 690, but may simply be coupled to the MFD 690 by either a wire or a wireless connection. The user I/O 699 may include keys and/or buttons (such as graphical keys or buttons, or other graphical elements, of a GUI on a touchscreen display) for inputting information or requesting various operations. Alternatively, the user I/O 699 and the display screen may be operated by a keyboard, a mouse, a remote control, voice recognition (e.g., through a speaker/microphone 699a), or eye-movement tracking, or a combination thereof.

Printer engine 694, scanner engine 695 and network interface 696 are otherwise conventional, and therefore, a detailed description of such conventional aspects is omitted in the interest of clarity and brevity.

The MFD 690 can have any or all of the functions of similar devices conventionally known, such as for scanning, editing and storing images, sending a fax, sending and receiving e-mails with or without attachments, accessing files by FTP or another protocol or facility, surfing the Web, etc. Further, multi-functional devices or multi-function peripheral devices can play a prominent role to convert hardcopy documents to electronic documents.

The MFD 690 may also operate as a device management apparatus (e.g. device management apparatus 101 of FIG. 1). The operation of such device management apparatus according to an exemplary embodiment is described supra with reference to FIG. 1.

Figure 7A:
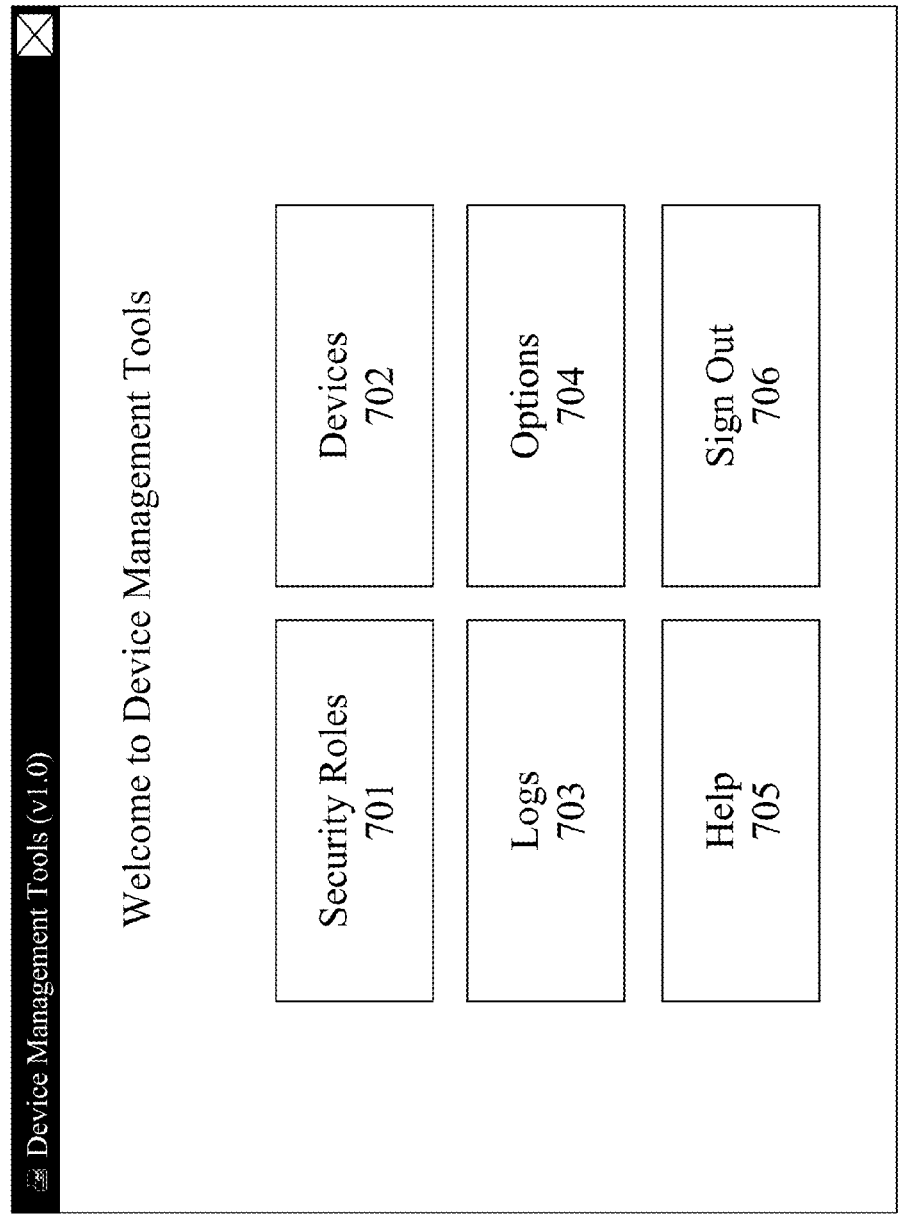
FIG. 7A shows a sample screenshot of a user interface displayed to the user, according to an exemplary embodiment.

FIG. 7A shows a screenshot of a main menu in an application software product for providing device management services, according to an exemplary embodiment. Such main menu screen is displayed on the terminal device of the user when the user successfully signs in, for example, by providing login credentials. In the example of FIG. 7A, the main menu screen has the following buttons: "security roles" button 701 for displaying security roles assigned to each user of the network environment, "devices" button 702 for displaying the list of network devices in the network environment, "logs" button 703 for displaying a log file which records various events that occur in the network environment managed by the device management application, "options" button 704 for allowing the user to configure various settings that govern the operation of the device management application, "help" button 705 for additional information about the application, and "sign out" button 706 for signing out of the device management application.

FIG. 7B shows a screenshot of a user interface displayed upon activating the "logs" button of FIG. 7A, according to an exemplary embodiment. As shown in FIG. 7B, a user name, date range and/or device management (DM) unit may be specified to narrow down the system access activities information displayed to the user. For example, in the example of FIG. 7B, the user name "John_Doe" is specified by the user, and when the "view log" button is activated, only the log entries associated with the user "John_Doe" are displayed in the results panel at the bottom of the screen. For example, information such as the date/time of the system access activity, the user initiating the access activity, the IP address of the device from which the user initiated the access activity, the details of the access activity, the connection type of the access activity, etc. are displayed to the user. The filters that can be used to narrow down the log result are not limited to those shown in the example of FIG. 7B and may include any other filters. If none of the filters are used (e.g. left blank), the user interface may display all log entries in the system. In addition to the example shown in FIG. 7B, all kinds of other logs may be maintained in the system, such as system log, task log, audit log, notification log, device job logs, device access logs, device ecology logs, etc., and such logs can be similarly filtered and viewed by the user via the user interface.

FIG. 7C shows a screenshot of a user interface displayed upon activating the "device list" button of FIG. 7, according to an exemplary embodiment. As shown in FIG. 7C, a list of devices connected to the network (or networks accessible by the user) is displayed to the user. In the example of FIG. 7C, the list is divided into three groups, each group of devices being managed by a different device management unit. That is, each of the device management units (e.g. DM Units 1-3) is responsible for managing a subset of the network devices in the network environment. At the top of the screen, buttons are provided for returning to the main menu screen ("main menu"), installing a new network device or DM unit ("add"), viewing/configuring the settings for one or more existing devices or DM units ("view/configure settings"), uninstalling one or more existing devices or DM units ("uninstall"), and obtaining additional details regarding the device list ("help").

FIG. 8A shows a screenshot of a user interface displayed upon activating the "security roles" button of FIG. 7A, according to an exemplary embodiment. As shown in FIG. 8A, a list of users in the network environment is displayed on the left side of the screen, and a selected user's corresponding security role is displayed on the right side of the screen. For example, "John Doe" is selected in the example of FIG. 8A, and his security role "device admin" is displayed on the right side of the screen. As shown by the drop-down menu in FIG.

8B, the security role assigned to the user can be changed by selecting a security role other than the one currently assigned to the selected user.

At the bottom of the screen in FIG. 8A, an access privilege summary is displayed. The access privilege summary shows a list of access privileges (e.g. "AddressBookRead", "AuditRead", "SysConfigRead", etc.) that the selected user is granted. For example, having a checkmark next to the box that says "AddressBookRead" indicates that the selected user is allowed to view address book information stored in the system. On the other hand, the lack of a checkmark next to the box that says "ReportWrite" indicates that the selected user ("John_Doe") is not allowed to create or modify any reports (e.g. device summary report, error report, etc.).

The user may also create new security roles ("create new") or edit ("edit") or delete ("delete") one or more existing security roles.

FIG. 9A shows a screenshot of a user interface (UI) displayed upon activating the "create new" button of FIG. 8A, according to an exemplary embodiment.

As shown in FIG. 9A, the user interface for creating a new security role allows the user to specify the name of the security role, the time after which user login expires, a group of users who are automatically assigned the new security role, and specific users to be assigned the new security role. The user interface also allows the user to choose an existing security role ("choose a security role") using a drop-down menu.

Figure 9B:
FIG. 9B shows a sample screenshot of a user interface displayed to the user, according to an exemplary embodiment.

For example, as shown in FIG. 9B, the user has specified the name of the new security role ("custom_1"), the login expiry time (10 minutes), a group whose members are automatically assigned to the new security role ("IT_USA") [for example, an LDAP (Lightweight Directory Access Protocol) group can be specified, and the users in the specified LDAP group can be automatically assigned to the new security role], and users to be assigned to the new security role ("John_Doe", "Peter_Su", "Kate_Roy"). The information that the user interface allows the user to specify is not limited to that shown in the examples of FIGS. 9A and 9B, and can include other information.

Further, the user interface allows the user to restrict the security role to selected device management groups. For example, in the example of FIG. 9B, the device management (DM) units "USA_NY" and "USA_CA" are selected. Thus, users assigned to this new security role can only read and/or write device information of devices managed by the selected DM units ("USA_NY" and "USA_CA"), and not devices managed by other unselected DM units.

Also, the user interface allows the user to select device privileges from a plurality of device privileges associated with an existing security role (or "all" which lists all the available device privileges), as shown in FIG. 9B, and create the new security role based on the selected security role. For example, if the user wishes to create a new security role that is similar to an existing security role but has one addition device privilege, the user can simply import all the device privileges associated with the existing security role and add the additional device privilege to the list of device privileges associated with the new security role, and does not have to go through the trouble of adding each device privilege one by one.

Figure 9C:
FIG. 9C shows a sample screenshot of a user interface displayed to the user, according to an exemplary embodiment.

As shown in FIG. 9B, when the security role "device admin" is selected, the device privileges associated with the security role "device admin" are displayed, as shown in FIG. 9C. The user can select one or more device privileges from the list of device privileges associated with the security role "device admin", and click on the "copy" button to add the selected device privilege(s) to the list of device privileges associated with the new security role. As shown in FIG. 9C, the device privilege "DeviceAdvancedRead" selected on the left side is copied to the right side of the screen and associated with the new security role (e.g. "custom_1").

Figure 9D:
FIG. 9D shows a sample screenshot of a user interface displayed to the user, according to an exemplary embodiment.

The user can further add other device privileges associated with a different security role. For example, in FIG. 9D, the security role "reports admin" is selected on the left side of the screen and the "copy all" button is activated to import all the device privileges of the security role "reports admin" to the right side of the screen corresponding to the new security role "custom_1".

Figure 9E:
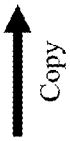
FIG. 9E shows a sample screenshot of a user interface displayed to the user, according to an exemplary embodiment.

The user can also remove device privileges associated with the new security role by selecting the device privilege(s) that the user wishes to remove, and activating the "remove selected" button. In the example of FIG. 9E, the device privilege "ReportWrite" has been removed by selecting the device privilege "ReportWrite" and activating the "remove selected" button.

Once the user clicks on the "save" button, the new security role is created and added to the list of security roles, as shown in FIG. 10. Such newly added security role may be registered with the device management unit (s) and/or core management unit (s) discussed in the present disclosure. For example, the new security role may be added to the table maintained by the device management apparatus, such as shown in FIG. 5E.

FIG. 11 shows a screenshot of the user interface for creating a new security role, according to an exemplary embodiment. In the example of FIG. 11, the user interface allows the user to load the device privileges from an existing security role, and check or uncheck checkboxes to add or remove device privileges in the table of device privileges to customize the new security role. The table of device privileges shown in FIG. 11 is merely exemplary, and the table can include various other device privileges available for the devices in the network environment.

Figure 12A:
FIG. 12A shows a sample screenshot of a user interface displayed to the user, according to an exemplary embodiment.

FIG. 12A shows a screenshot of a user interface for creating a new security role, according to an exemplary embodiment. The user interface in FIG. 12A allows the user to select one or more existing security roles (or "all" which includes all available device privileges) and import all the device privileges associated with the selected security role(s). Thus, the user interface shown in FIG. 12A allows the user to easily combine the device privileges of multiple security roles to create a new security role that includes the device privileges of all of such multiple security roles.

Figure 12B:
FIG. 12B shows a sample screenshot of a user interface displayed to the user, according to an exemplary embodiment.

FIG. 12B shows an example in which two security roles "device admin" and "device operator" are selected and the device privileges associated with the security roles are copied to the right side of the screen. As shown in FIG. 12B, a combination of the device privileges associated with "device admin" and the device privileges associated with "device operator" are associated with the new security role.

Figure 12C:
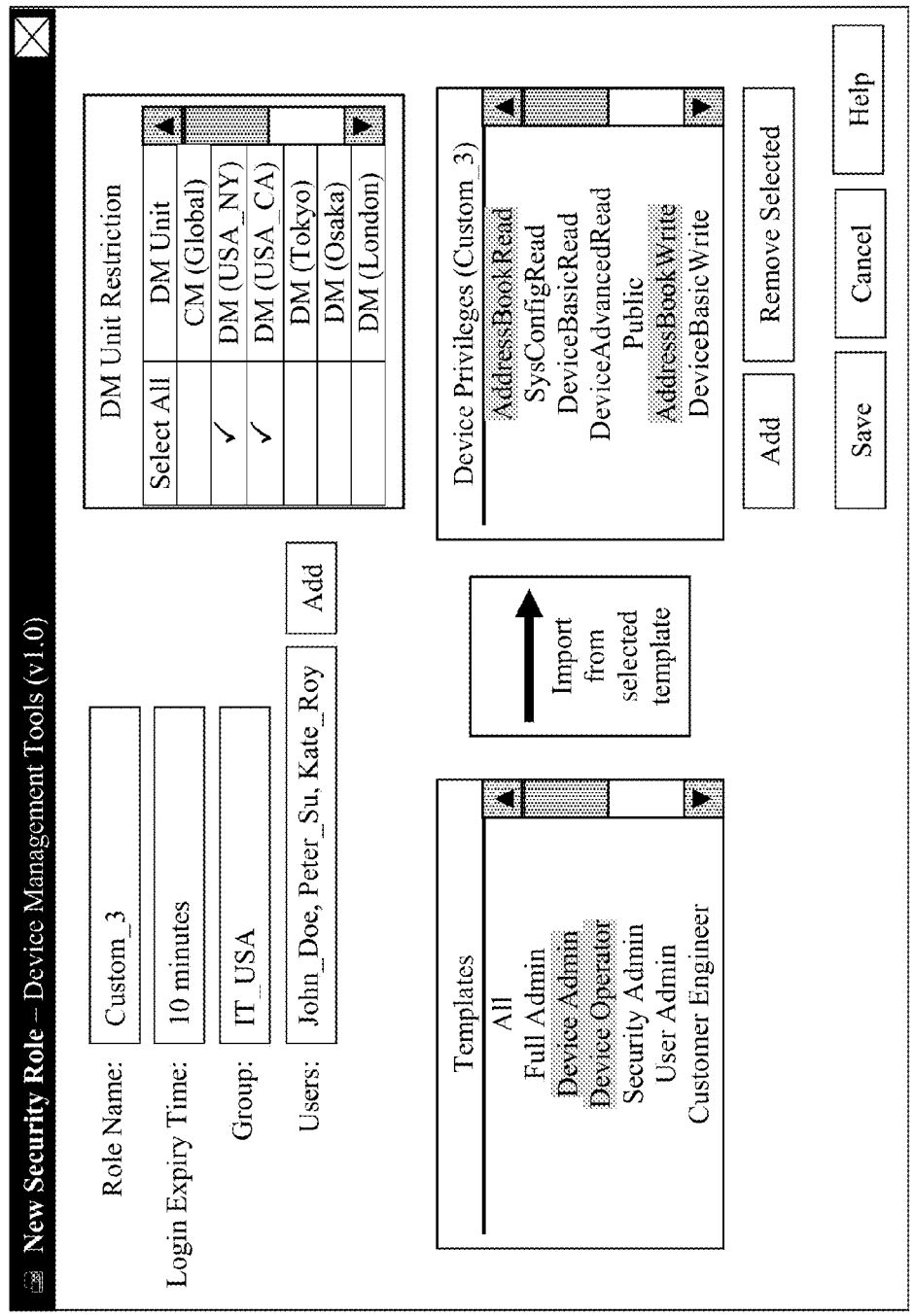
FIG. 12C shows a sample screenshot of a user interface displayed to the user, according to an exemplary embodiment.
Figure 12D:
FIG. 12D shows a sample screenshot of a user interface displayed to the user, according to an exemplary embodiment.

The user can then either add additional device privileges to the list, using the "add" button, or remove device privileges from the list using the "remove selected" button. Upon activating the "add" button, the user may choose one or more device privileges from a list of device privileges to add the chosen one or more device privileges to the list of device privileges associated with the new security role "custom_3". If the user wishes to remove one or more device privileges from the list, the user can simply select such device privilege(s) and click on the "remove selected" button. For example, as shown in FIG. 12C, the device privileges "AddressBookRead" and "AddressBookWrite" are selected. When the user activates the "removed selected" button, the selected device privileges are removed from the list, as shown in FIG. 12D.

Figure 13:
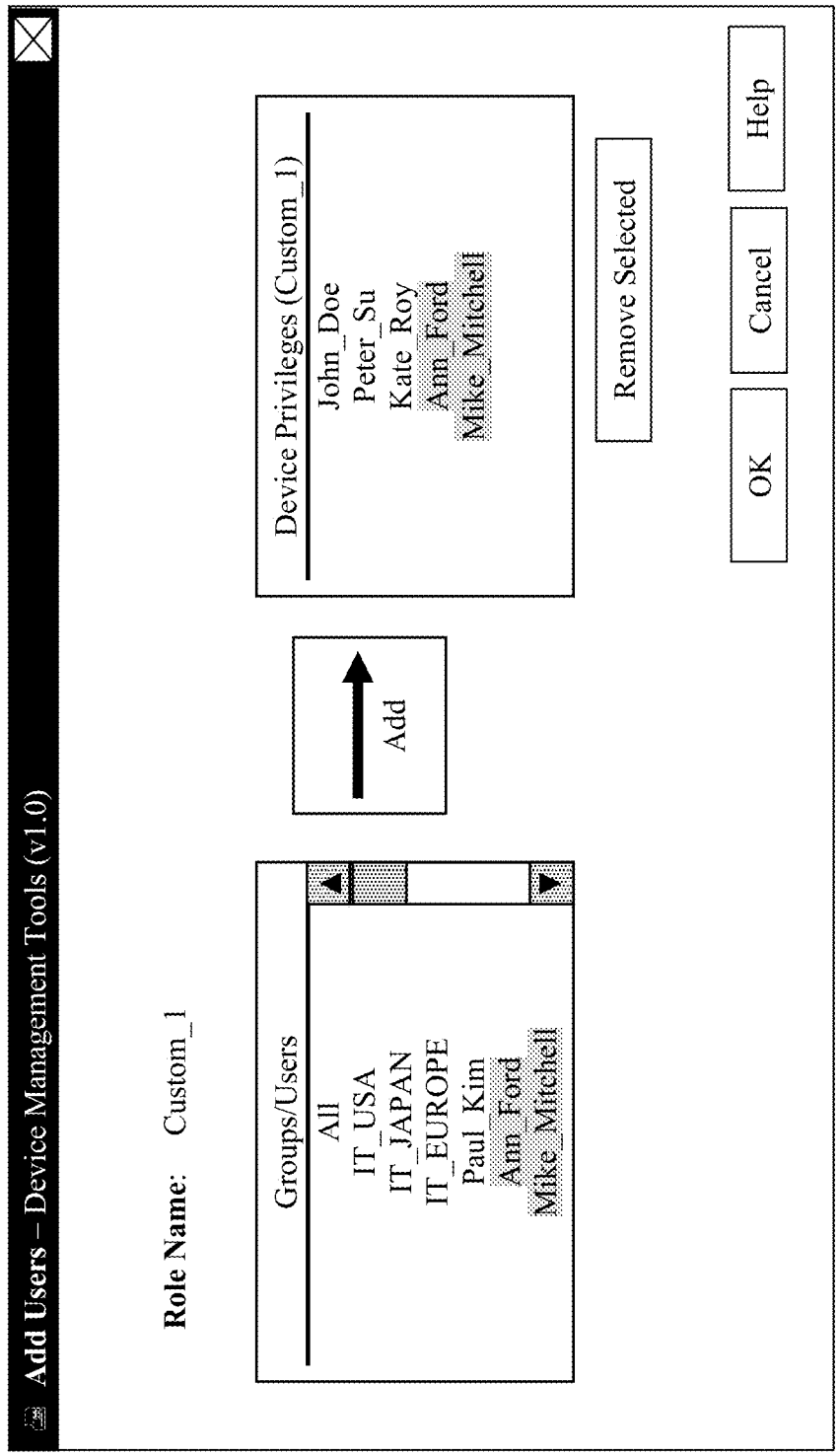
FIG. 13 shows a sample screenshot of a user interface displayed to the user, according to an exemplary embodiment.

FIG. 13 shows a screenshot of a user interface displayed upon activating the "add" button for adding users to the list of user assigned to the new security role, as shown in FIGS. 8-12. As shown in FIG. 13, the user interface displays the various groups and usernames in the network environment, and allows the user to add selected groups/usernames to the list of users assigned to the security role. In the example of FIG. 13, the users "Ann_Ford" and "Mike_Mitchell" are selected and added to the list of users assigned to the security role "custom_1".

The user interfaces shown in FIGS. 7-13 are merely examples of how the security roles may be customized, and the user interface for customizing the security roles in a network environment may be presented to the user in a variety of other different ways.

Figure 15:
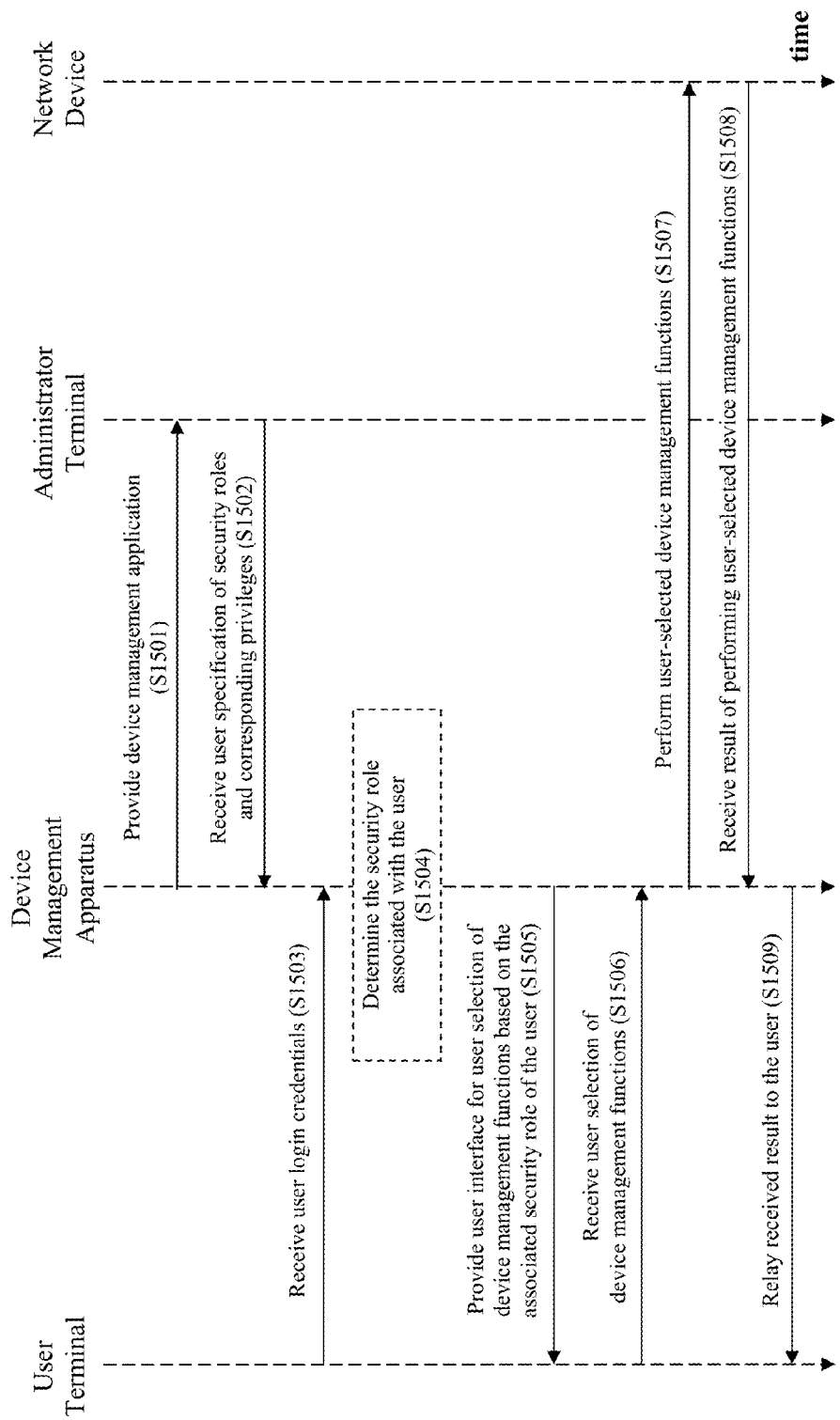
FIG. 15 shows a work flow of a method for managing plural devices, according to an exemplary embodiment.

With reference to FIG. 15, a method for managing plural devices in a network system, according to an exemplary embodiment, is described.

The device management apparatus provides a device management application through the network to the administrator terminal (step S1501) to provide a user interface via which the administrator at the administrator terminal may configure and customize the various security roles and assigned the security roles to the users in the system (e.g. network environment) (step S1502). When the device management apparatus receives the login credentials of a particular user in the system (step S1503), the device management apparatus determines the security role associated with the particular user (step S1504) by, for example, looking up the user name of the user in a table associating the various users in the system with corresponding security roles assigned by the administrator. Upon determining the security role associated with the particular user, the device management apparatus provides a user interface for user selection of device management functions to the user terminal, based on the associated security role of the user (step S1505). For example, if the particular user is determined to be a "full admin", the user interface displayed to the user may include all the functions and options available in the system. On the other hand, if the particular user is determined to be a public user, the user interface displayed to the user may display limited options and may not allow the particular user to change or set any settings.

Once the device management apparatus receives the user selection of the device management functions (e.g. reading the device capabilities of a printer) from the user terminal (step S1506), the device management apparatus performs the device management functions selected by the particular user (step S1507), receives the result (e.g. the device capabilities of the printer) of performing the selected device management functions (step S1508), and relays the received result to the user terminal (e.g. displays the device capabilities of the printer to the particular user) (step S1509).

Thus, in the aforementioned aspects of the present disclosure, the scope of access of the administrators in an information technology environment can be customized in a convenient manner.

The aforementioned specific embodiments are illustrative, and many variations can be introduced on these embodiments without departing from the spirit of the disclosure or from the scope of the appended claims. For example, elements and/or features of different examples and illustrative embodiments may be combined with each other and/or substituted for each other within the scope of this disclosure and appended claims.

What is claimed is:

1. A device management apparatus configured, for monitoring, managing and using plural devices in a network system, said device management apparatus including non-transitory storage media storing one or more programs of executable instructions that when executed by a computer, provide a user interface comprising:

a role customizing user interface including (i) a template selection user interface part that permits a system administrator to select one or more security roles to be cloned, from plural default security role templates, each of the one or more security roles including one or more device privileges, and (ii) a role modifying user interface part that permits the system administrator to add one or more additional device privileges to the cloned security role or delete one or more undesirable privileges from the cloned security role, to create a modified security role and register the modified security role as a new security role in the network system; and a user privileges management user interface that permits the system administrator to set access privileges of a specific user to those associated with the new security role, wherein the role modifying user interface part is configured to add to, or delete from, the cloned security role a privilege to access device settings of one or more of the plural devices in the network system, wherein the role modifying user interface part permits the system administrator to select at least one privilege from one security role and at least one privilege from another security role, to be added to the cloned security role, to form the modified security role, wherein the template selection user interface part permits the system administrator to select two or more security roles from the plural default security role templates, and in response to the selection of the two or more security roles, the role modifying user interface part provides a list of merged device privileges constituted by merging the device privileges of the selected security roles, and wherein the role modifying user interface part permits the system administrator to (a) add one or more additional device privileges to the list of merged device privileges or (b) delete one or more undesirable privileges from the list of merged device privileges.

2. The device management apparatus of claim 1, wherein when the one or more additional device privileges are added to the cloned security role to create the modified security role, the role modifying user interface part provides a list of candidate privileges from which the system administrator selects said one or more additional device privileges to be added to the cloned security role.

3. The device management apparatus of claim 1, wherein when the one or more additional device privileges are added to the cloned security role to create the modified security role, the role modifying user interface part provides a list of the plural default security role templates, and upon selection of another security role in the list of the plural default security role templates, provides a list of device privileges associated with said another security role, for selection of the one or more additional device privileges to be added to the cloned security role.

4. The device management apparatus of claim 1, wherein when the one or more undesirable privileges are to be deleted from the cloned security role to create the modified security role, the role modifying user interface part provides, upon selection of the particular security role, a list of device privileges associated with the cloned security role, for selection of the one or more undesirable privileges to be deleted from the cloned security role.

5. The device management apparatus of claim 1,
wherein said device management apparatus provides one or more device management functions, and said device management functions include an audit function to read activities information indicating system access activities of a specified user, and
wherein the one or more additional device privileges added by the role modifying user interface part to the cloned security role include invoking, from a terminal amongst the plural terminals, the audit function to read the activities information indicating the system access activities of the specified user.

6. The device management apparatus of claim 1,
wherein said device management apparatus provides one or more device management functions, and said device management functions include changing system settings of a specified device, and
wherein the one or more additional device privileges added by the role modifying user interface part to the cloned security role include invoking a specified device management function to change the system settings of the specified device, from a terminal amongst the plural terminals.

7. The device management apparatus of claim 1,
wherein said device management apparatus provides one or more device management functions, and said device management functions include reading device capabilities information of a specified device, wherein the one or more additional device privileges added by the role modifying user interface part to the cloned security role include invoking a specified device management function to read the device capabilities information of the specified device, from a terminal amongst the plural terminals.

8. The device management apparatus of claim 1, wherein the user privileges management user interface displays a list of users set to have the device privileges associated with the new security role.

9. A system for managing devices in a network environment, said system comprising:
one or more device management apparatuses, each device management apparatus amongst the one or more device management apparatuses collecting device data from a corresponding plurality of network devices; and
non-transitory storage media storing one or more programs of executable instructions that when executed by a computer, provide a user interface comprising:
a role customizing user interface including (i) a template selection user interface part that permits a system administrator to select one or more security roles to be cloned, from plural default security role templates, each of the one or more security roles including one or more device privileges, and (ii) a role modifying user interface part that permits the system administrator to add one or more additional device privileges to the cloned security role or delete one or more undesirable privileges from the cloned security role, to create a modified security role and register the modified security role as a new security role in the system,
wherein the role modifying user interface part permits the system administrator to select at least one privilege from one security role and at least one privilege from another security role, to be added to the cloned security role, to form the modified security role,
wherein the template selection user interface part permits the system administrator to select two or more security roles from the plural default security role templates, and in response to the selection of the two or more security roles, the role modifying user interface part provides a list of device privileges constituted by merging the device privileges of the selected security roles, and
wherein at least one device management apparatus amongst the device management apparatuses provides an audit function to read activities information indicating system access activities of a specified user, and
wherein the one or more additional device privileges added by the role modifying user interface part to the cloned security role include invoking, from the computer executing the one or more programs of executable instructions, the audit function to read the activities information indicating the system access activities of the specified user.

10. The system of claim 9, wherein the role customizing user interface includes a system restrictions user interface part that permits the system administrator to specify restrictions of the new security role to device management functions of a selected device management apparatus amongst the plurality of device management apparatuses.

11. The system of claim 9, wherein at least one device management apparatus amongst the device management apparatuses is configured to provide a settings access function to access system settings of a specified device, and wherein the one or more additional device privileges added by the role modifying user interface part to the cloned security role include invoking the settings access function of the device management unit to change the system settings of the specified device.

12. The system of claim 9, wherein at least one device management apparatus amongst the device management apparatuses is configured to provide a device access function to read device capabilities information of a specified device, and wherein the one or more additional device privileges added by the role modifying user interface part to the cloned security role include invoking the device access function to read the device capabilities information of the specified device, from a terminal in the system.

13. The system of claim 9, further comprising: a core management apparatus configured to manage the device management apparatuses, wherein the role customizing user interface registers the new security role in the system with at least one of the core management apparatus and the device management apparatuses.

14. The system of claim 10, further comprising: a core management apparatus configured to manage the device management apparatuses, wherein the role customizing user interface further includes a system restrictions user interface part that permits the system administrator to specify restrictions of the new security role from management functions of the core management apparatus.

15. A method for managing plural devices in a network system, the method comprising:
providing a device management application including one or more programs of executable instructions that when executed by a computer, provide a user interface including (i) a template selection user interface part that permits a system administrator to select one or more security roles to be cloned, from plural default security role templates, each of the one or more security roles including one or more device privileges, and (ii) a role modifying user interface part that permits the system administrator to add one or more additional device privileges to the cloned security role or delete one or more undesirable privileges from the cloned security role, to create a modified security role and register the modified security role as a new security role in the network system;

causing a specified privilege to access device settings of one or more of the plural devices in the network system to be added to, or deleted from, the cloned security role; and setting access privileges of a specific user to those associated with the new security role, wherein the role modifying user interface part permits the system administrator to select at least one privilege from one security role and at least one privilege from another security role, to be added to the cloned security role, to form the modified security role, wherein the template selection user interface part permits the system administrator to select two or more security roles from the plural default security role templates, and in response to the selection of the two or more security roles, the role modifying user interface part provides a list of merged device privileges constituted by merging the device privileges of the selected security roles, wherein the role modifying user interface part permits the system administrator to (a) add one or more additional device privileges to the list of merged device privileges or (b) delete one or more undesirable privileges from the list of merged device privileges.

16. The method of claim 15, further comprising:

providing, when the one or more additional device privileges are added to the cloned security role to create the modified security role, a list of candidate privileges from which the system administrator selects said one or more additional device privileges to be added to the cloned security role; and providing, when the one or more undesirable privileges are to be deleted from the cloned security role to create the modified security role, a list of device privileges associated with the cloned security role, for selection of the one or more undesirable privileges to be deleted from the cloned security role, upon selection of the particular security role.

17. The method of claim 15, further comprising:

communicating with any specific terminal of plural terminals in the network system; determining an associated security role of a user of the specific terminal; providing a user interface for user selection of one or more device management functions, including at least one of (a) an audit function to read activities information indicating system access activities of a specified user, (b) changing system settings of a specified device and (c) reading device capabilities information of a specified device, to which the user has privilege under the associated security role of the user; and performing a selected device management function in response to the selection of the device management function.

18. The method of claim 15, further comprising:

providing a system restrictions user interface to permit the system administrator to specify restrictions of the new security role to device management functions of a selected device management apparatus amongst a plurality of device management apparatuses, each device management apparatus collecting device data from a corresponding plurality of network devices.

* * * * *